United States Patent
Chen et al.

(10) Patent No.: US 8,359,451 B2
(45) Date of Patent: Jan. 22, 2013

(54) MANAGEMENT OF HOST PHYSICAL MEMORY ALLOCATION TO VIRTUAL MACHINES WITH A BALLOON APPLICATION

(75) Inventors: Xiaoxin Chen, Cupertino, CA (US); Carl A. Waldspurger, Palo Alto, CA (US); Anil Rao, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 351 days.

(21) Appl. No.: 12/729,428

(22) Filed: Mar. 23, 2010

(65) Prior Publication Data
US 2010/0241785 A1    Sep. 23, 2010

Related U.S. Application Data

(63) Continuation of application No. 11/525,607, filed on Sep. 21, 2006, now Pat. No. 7,716,446.

(60) Provisional application No. 60/796,069, filed on Apr. 27, 2006.

(51) Int. Cl.
G06F 13/00 (2006.01)
G06F 13/28 (2006.01)
G06F 9/46 (2006.01)

(52) U.S. Cl. .................. 711/170; 711/E12.002; 718/104
(58) Field of Classification Search .................. 711/170, 711/E12.002; 718/104
See application file for complete search history.

(56) References Cited

U.S. PATENT DOCUMENTS

| | | | |
|---|---|---|---|
| 5,493,663 A | 2/1996 | Parikh | |
| 5,606,685 A | 2/1997 | Frandeen | |
| 6,202,127 B1 | 3/2001 | Dean et al. | |
| 6,496,912 B1 | 12/2002 | Fields et al. | |
| 6,789,156 B1 | 9/2004 | Waldspurger | |
| 7,412,492 B1 | 8/2008 | Waldspurger | |
| 7,421,533 B2 | 9/2008 | Zimmer et al. | |
| 7,433,951 B1 | 10/2008 | Waldspurger | |
| 7,500,048 B1 | 3/2009 | Venkitachalam et al. | |
| 7,702,843 B1 | 4/2010 | Chen et al. | |
| 7,716,446 B1 | 5/2010 | Chen et al. | |
| 2006/0004944 A1 | 1/2006 | Vij et al. | |
| 2006/0064697 A1 | 3/2006 | Kagi et al. | |
| 2006/0161719 A1* | 7/2006 | Bennett et al. | 711/6 |
| 2007/0038837 A1* | 2/2007 | Ben-Zvi | 711/207 |
| 2007/0192329 A1 | 8/2007 | Croft et al. | |

OTHER PUBLICATIONS

C. A. Waldspurger, "Memory Resource Management in VMware ESX Server," Proceedings of the 5th Symposium on Operating Systems Design and Implementation (OSDI 2002), ACM Operating Systems Review, pp. 181-194, Dec. 2002.
Xiaoxin Chen et al., "Controlling Memory Conditions in a Virtual Machine", U.S. Appl. No. 11/525,373, filed Sep. 21, 2006. Alexander Thomas Garthwaite et al., "Efficient Readable Ballooning of Guest Memory by Backing Balloon Pages With a Shared Page", U.S. Appl. No. 12/835,303, filed Jul. 13, 2010.

* cited by examiner

Primary Examiner — Edward Dudek, Jr.

(57) ABSTRACT

Methods and systems for managing distribution of host physical memory (HPM) among virtual machines (VMs) executing on a host via a hypervisor are presented, where each VM has guest system software including an operating system. A method includes an operation for reserving, by a balloon application executing in a first VM, a guest virtual memory (GVM) location in the first VM. The GVM location is mapped to a guest physical memory (GPM) location, which is mapped to a host physical memory (HPM) location. The balloon application is responsive to the hypervisor for reserving memory. Further, the method includes operations for writing a value to the reserved GVM location and for remapping a plurality of GPM locations containing the value to a single HPM location. The remapping is performed by a content-based page sharing component of the hypervisor. Additionally, the method reclaims the HPM location when the HPM location is freed due to the remapping, and assigns the reclaimed HPM location to a different VM or to a pool of available HPM locations.

25 Claims, 17 Drawing Sheets

MANAGEMENT OF HOST PHYSICAL MEMORY ALLOCATION TO VIRTUAL MACHINES WITH A BALLOON APPLICATION

CLAIM OF PRIORITY

This application is a Continuation Application under 35 USC §120 and claims priority from U.S. application Ser. No. 11/525,607 entitled "SYSTEM AND METHOD FOR COOPERATIVE VIRTUAL MACHINE MEMORY SCHEDULING", and filed on Sep. 21, 2006, which claims the benefit of U.S. Provisional Application No. 60/796,069, filed Apr. 27, 2006, which are incorporated by reference in their entirety.

BACKGROUND OF THE INVENTION

1. Field of the Invention

The invention relates generally to virtualized computer systems, and specifically to memory management for a virtual machine.

2. Description of Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization also provides greater security, since the virtualization can isolate potentially unstable or unsafe software so that it cannot adversely affect the hardware state or system files required for running the physical (as opposed to virtual) hardware.

As is well known in the field of computer science, a virtual machine (VM) is a software abstraction—a "virtualization"—of an actual physical computer system. FIG. 1 shows one possible arrangement of a computer system 700 that implements virtualization. A virtual machine (VM) 200, which in this system is a "guest," is installed on a "host platform," or simply "host," which will include a system hardware 100, that is, a hardware platform, and one or more layers or co-resident components comprising system-level software, such as an operating system (OS) or similar kernel, a virtual machine monitor or hypervisor (see below), or some combination of these.

As software, the code defining the VM will ultimately execute on the actual system hardware 100. As in almost all computers, this hardware will include one or more CPUs 110, some form of memory 130 (volatile or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x86 platform. Because of the advantages of virtualization, however, some hardware vendors are producing hardware processors that include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one virtual disk 240, and one or more virtual devices 270. Note that a storage disk—virtual 240 or physical 140—is also a "device," but is usually considered separately because of the important role it plays. All of the virtual hardware components of the VM may be implemented in software to emulate corresponding physical components. The guest system software includes a guest operating system (OS) 220 and drivers 224 as needed, for example, for the various virtual devices 270.

To permit computer systems to scale to larger numbers of concurrent threads, systems with multiple CPUs—physical or logical, or a combination—have been developed. One example is a symmetric multi-processor (SMP) system, which is available as an extension of the PC platform and from other vendors. Essentially, an SMP system is a hardware platform that connects multiple processors to a shared main memory and shared I/O devices. Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as at least some cache. Still another technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB).

Similarly, a single VM may (but need not) be configured with more than one virtualized physical and/or logical processor. By way of example, FIG. 1 illustrates multiple virtual processors 210, 211, . . . , 21m (VCPU0, VCPU1, . . . , VCPUm) within the VM 200. Each virtualized processor in a VM may also be multi-core, or multi-threaded, or both, depending on the virtualization. This invention may be used to advantage regardless of the number of processors the VMs are configured to have.

If the VM 200 is properly designed, applications 260 running on the VM will function essentially as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is generally required between the guest software within a VM and the various hardware components and devices in the underlying hardware platform. This interface—which may be referred to generally as "virtualization software" or "virtualizatino layer"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, the invention described below may be used in virtualized computer systems having any type or configuration of virtualization software. Moreover, the invention is described and illustrated below primarily as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented with components residing anywhere within the overall structure of the virtualization software.

By way of illustration and example only, the figures show each VM running on a corresponding virtual machine monitor. The description's reference to VMMs is also merely by way of common example. A VMM is usually a software component that virtualizes at least one hardware resource of some physical platform, so as to export a hardware interface to the VM corresponding to the hardware the VM "thinks" it is running on. As FIG. 1 illustrates, a virtualized computer system may (and usually will) have more than one VM, each of which may be running on its own VMM.

The various virtualized hardware components in the VM, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in some part of the virtualization software, such as the VMM. One advantage of such an arrangement is that the virtualization software may (but need not) be set up to expose "generic" devices, which facilitate, for example, migration of VM from one hardware platform to another.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, this invention is not restricted to use in systems with any particular "degree" of virtualization and is not to be limited to any particular notion of full or partial ("para-") virtualization.

In addition to the distinction between full and partial (para-) virtualization, two arrangements of intermediate system-level software layer(s) are in general use—a "hosted" configuration (illustrated in FIG. 2) and a non-hosted configuration (illustrated in FIG. 1). In a hosted virtualized computer system, an existing, general-purpose operating system forms a "host" OS that is used to perform certain input/output (I/O) operations, alongside and sometimes at the request and direction of the VMM 300. The host OS 420, which usually includes drivers 424 and supports applications 460 of its own, and the VMM are both able to directly access at least some of the same hardware resources, with conflicts being avoided by a context-switching mechanism. The Workstation product of VMware, Inc., of Palo Alto, Calif., is an example of a hosted, virtualized computer system.

In addition to device emulators 370, FIG. 2 also illustrates some of the other components that are also often included in the VMM of a hosted virtualization system; many of these components are found in the VMM of a non-hosted system as well. For example, exception handlers 330 may be included to help context-switching, and a direct execution engine 310 and a binary translator 320 with associated translation cache 325 may be included to provide execution speed while still preventing the VM from directly executing certain privileged instructions.

In many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform (such as shown in FIG. 2), use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as any "console" operating system 420 that, in some systems, is included to boot the system as a whole and for enabling certain user interactions with the kernel. The console OS in FIG. 1 may be of the same type as the host OS in FIG. 2, which is why they are identically numbered—the main difference is the role they play (or are allowed to play, if any) once the virtualized computer system is loaded and running.

This invention may be used to advantage in both a hosted and a non-hosted virtualized computer system, in which the included virtual machine(s) may be fully or para-virtualized, and in which the virtual machine(s) have any number of virtualized processors, which may be of any type (including multi-core, multi-threaded, or some combination). The invention may also be implemented directly in a computer's primary OS, both where the OS is designed to support virtual machines and where it is not. Moreover, the invention may even be implemented wholly or partially in hardware, for example in processor architectures intended to provide hardware support for virtual machines.

To facilitate effective memory management, many operating systems in use today introduce a layer of abstraction between the memory addresses used by the applications and the memory addresses describing physical memory. When an application requests memory, the operating system will allocate memory in a first address space, typically called a virtual memory address space. This first memory address space maps to a second memory address space, typically the physical memory of the computer. A page table organizes the relationships between the two address spaces and maps memory addresses (for example, given as page numbers) of the first memory address space to memory addresses of the second memory address space. It is common for multiple virtual memory address spaces, as well as multiple page tables, to be implemented in modern operating systems. For example, each application may have its own virtual memory address space. In many systems, each application can treat its virtual memory address space as if it had exclusive use of that memory. The operating system organizes these virtual memory addresses spaces and keeps track of the corresponding physical memory address using entries in a page table.

One of the advantages of using virtual memory address spaces is that the amount of virtual memory used by the applications may exceed the amount of physical memory available on the computer. When such a situation occurs, the operating system will use a secondary storage medium, such as a hard disk, to store some of the data contained in virtual memory. When data from some virtual memory pages is actually stored on the secondary storage medium, the page table will map some virtual memory addresses to physical memory addresses, while mapping other virtual memory addresses to locations on the secondary storage medium.

If an application attempts to access a virtual memory address not mapped to physical memory, the operating system will detect a page fault. In response to a page fault, the operating system will retrieve the requested data from the appropriate storage device, store it in physical memory, and update the page table with the address of the location in physical memory. Retrieving a page and storing it in physical memory is commonly described as "paging-in" the requested page. Frequently, in order to page-in some data, the operating system must first make room in the physical memory. One method for making room in the physical memory is by "paging-out" a page presently stored in the physical memory. Paging-out refers to the process of copying a page from the physical memory to another storage device and updating the page table accordingly. Subsequent access to that virtual memory address will then result in another page fault and the paging-in process will repeat. Ideally, the operating system will page-out pages that are inactive so that they will not have to be paged back in for some reasonable amount of time. Various methods for determining which pages are inactive and are good candidates to be paged-out are well known in the art.

When a guest operating system 220 is run on a virtual machine 200, the guest operating system 220 treats the virtual memory 230 as if it were the physical memory of a computer system. Thus the guest operating system 220 will create virtual memory address spaces (not shown) and map them into the virtual memory 230.

The virtualization layer introduces an additional layer of memory management abstraction. The kernel 600 typically emulates the virtual memory 230 by mapping the virtual memory 230 to the physical memory 130. In many ways, the mapping of the virtual memory 230 to the physical memory 130 is analogous of the mapping of virtual memory addresses to physical memory addresses performed by an operating system. Guest operating systems 220 running on various virtual machines 200 are allowed to treat their virtual memory 230 as if they had exclusive control over that memory, when in fact those virtual memory address spaces are mapped to physical memory 130. Furthermore, as in virtual memory managed by an operating system, the total amount of virtual memory 230 used by the various virtual machines 200 may exceed the total amount of physical memory 130. The virtual machine monitor 300 organizes these virtual memory addresses and keeps track of the corresponding physical memory addresses in the memory 130.

Thus, when a guest operating system 220 implementing virtual memory is run on a virtual machine, typically three levels of memory address spaces are used. The guest operating system 220 organizes some virtual memory address spaces. For the purposes of this application, these addresses spaces are referred to as "guest virtual memory" which are addressed using a "guest virtual page number" (GVPN). The guest operating system 220 maintains a page table that maps this guest virtual memory to the virtual memory 230. Typically, the guest operating system 220 treats the virtual memory 230 as if it were physical memory. For the purposes of this application, the address space of the virtual memory 230 is referred to as the "guest physical memory'" which is addressed using a "guest physical page number" (GPPN). The virtual machine monitor 300 maintains a data structure (such as a page table) that maps this guest physical memory to the physical memory 130. The physical memory 130 is addressed using a "physical page number" (PPN), which is sometimes also referred to as a "machine page number" (MPN).

One approach for allowing the total amount of guest physical memory used by the various virtual machines 200 to exceed the total amount of physical memory is for the kernel 600 to page-out some of the inactive guest physical memory. For example, the kernel 600 can copy pages from the physical memory 130 to the disk 140 and adjust the page table entry for the corresponding guest physical memory accordingly. However, such an approach has several problems. First of all, determining which guest physical memory pages are less active (and therefore suitable for page-out) is a challenging task, and it is difficult to find inactive pages with a high degree of accuracy. Paging-out a page that is actively being used will result in a page fault and require the selection of another page for page-out in the near future. The subsequent paging and repaging cycle can seriously affect the performance of the system, and in worst cases, can bring the virtual machine to an effective halt, a condition commonly referred to as "thrashing".

Furthermore, even if an inactive page of the guest physical memory is determined with a high degree of accuracy, paging-out this page introduces a problem known as "double-paging." If the guest physical memory is constrained, the guest operating system 220 will be searching for inactive guest virtual memory pages as candidates for page-out. When it finds an inactive guest virtual memory page, it will attempt to read from the corresponding guest physical memory page to perform the page-out. However, since the guest physical memory page is also inactive, it may have already been paged-out by the kernel 600. If the guest physical memory page has already been paged-out by the kernel 600, the attempt to page-out the guest virtual memory will result in a guest physical memory page fault, and the inactive guest physical page will be paged back in. Thus interference between the memory management of the guest operating system 220 and the kernel 600 can significantly reduce the effectiveness of paging-out guest physical memory pages.

Another approach for managing allocations of physical memory to various virtual machines is to dynamically change the size of the guest physical memory. However, most guest operating systems 220 do not provide a mechanism by which the amount of guest physical memory can be increased or decreased during execution of the operating system. Therefore, current techniques for managing allocations of physical memory to various virtual machines are inadequate.

SUMMARY OF THE INVENTION

Methods and systems for managing distribution of host physical memory (HPM) among virtual machines (VMs) executing on a host via a hypervisor are presented, where each VM has guest system software including an operating system. In one embodiment of a method, a balloon application executing in a first VM reserves a guest virtual memory (GVM) location in the first VM. The GVM location is mapped to a guest physical memory (GPM) location, which is mapped to a host physical memory (HPM) location. Further, the balloon application is responsive to the hypervisor for reserving memory. The method includes an operation for writing a value to the reserved GVM location, and an operation for remapping a plurality of GPM locations containing the value to a single HPM location. The remapping is performed using a content-based page sharing component of the hypervisor. Additionally, the HPM location is reclaimed when the HPM location is freed due to the remapping, and the reclaimed HPM location is assigned to a second VM or to a pool of available HPM locations.

In another embodiment, a method includes an operation for receiving, by a balloon application executing in a first VM, a memory allocation request from the hypervisor. Further, the method reserves a guest virtual memory (GVM) location in response to the memory allocation request. The GVM location is mapped to a guest physical memory (GPM) location, which is mapped to a host physical memory (HPM) location. Further, the method includes operations for sending the GVM location to the hypervisor, for remapping the GPM location mapped by the GVM location, and for reclaiming the HPM location after remapping the GPM location. The reclaimed HPM location is then assigned to a second VM.

In yet another embodiment, a system for managing distribution of physical memory among virtual machines (VMs) executing on a host via a hypervisor is presented. The system includes a balloon application executing in a first VM and a content-based page sharing component in the hypervisor. The balloon application is defined to reserve a guest virtual memory (GVM) location in the first VM. The GVM location is mapped to a guest physical memory (GPM) location, which is mapped to a host physical memory (HPM) location. Further, the balloon application is responsive to the hypervisor for reserving memory. The content-based page sharing component remaps a plurality of GPM locations to a single HPM location when the balloon application writes a value to the reserved GVM location and each page from the plurality of GPM locations contains the same value. The hypervisor reclaims the HPM location when the HPM location is freed due to being remapped in order to make the HPM location available to a VM different from the first VM or to a pool of available HPM locations.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digits of each reference number correspond to the figure in which the reference number is first used.

The invention is a system and method for reclaiming memory assigned to a virtual machine. A resource reservation application (called a "balloon application") running as a guest application in the virtual machine requests a location in the guest virtual memory from the guest operating system. According to one embodiment of the present invention, the balloon application also periodically accesses the allocated guest virtual memory location. Depending on memory conditions in the virtual machine, such accesses either keep the guest virtual memory location mapped to a location in guest physical memory (i.e. they preempt a page-out by the guest operating system) or cause a page-fault (i.e. they force the guest operating system to page-in the location in guest physical memory.) By reserving guest virtual memory, the balloon application assists with the reclamation of physical memory.

The balloon application is responsive to commands sent from outside the virtual machine (for example, from the virtual machine monitor). The virtualization layer may use these commands to influence the balloon application's usage of guest virtual memory. For example, the balloon application can receive commands indicating the size of the allocation to request from the guest operating system, and the frequency with which to access that memory. Reserving guest virtual memory using a balloon application provides increased control freedom compared to reserving guest physical memory directly. Such control freedom allows for more subtle manipulation of memory conditions in the virtual machine. Periodically accessing guest virtual memory maintains or creates allocations of guest physical memory, which assists the kernel 600 with the reclamation of physical memory for the virtual machine.

To facilitate communication between the balloon application and the virtualization layer, a device driver (sometimes referred to as a "balloon application driver") can be included in the guest operating system 220. The balloon application driver is useful for sending and receiving messages to and from the balloon application, as well as for detecting page-out of the allocated guest virtual memory by the guest operating system. Furthermore, as an added optimization, the balloon application driver can implement techniques causing the allocated location to appear to the guest operating system as if it had been accessed, without the step of actually accessing that location.

Figure 1:
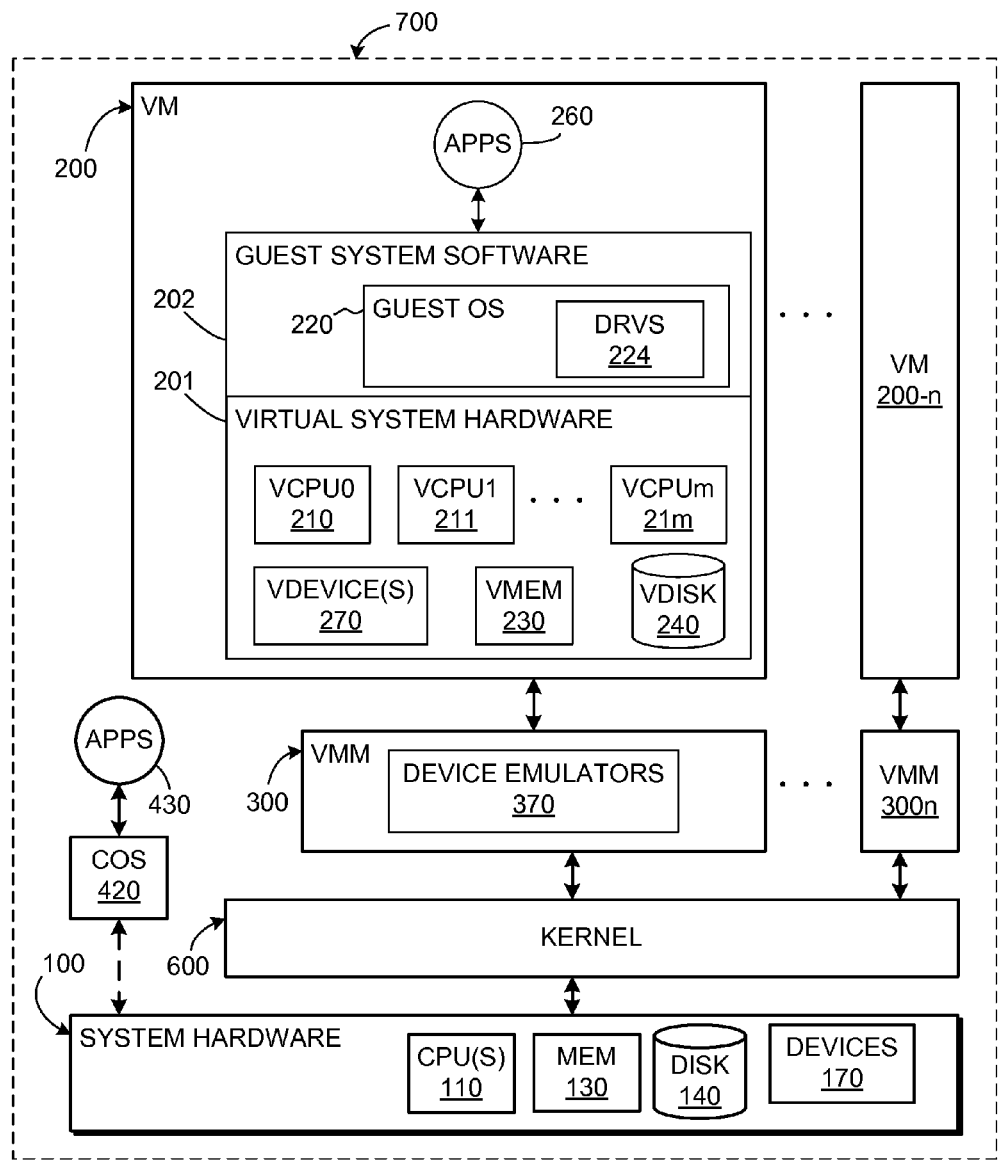
FIG. 1 (prior art) shows one example of a virtualized computer system in which the present invention can operate.
Figure 2:
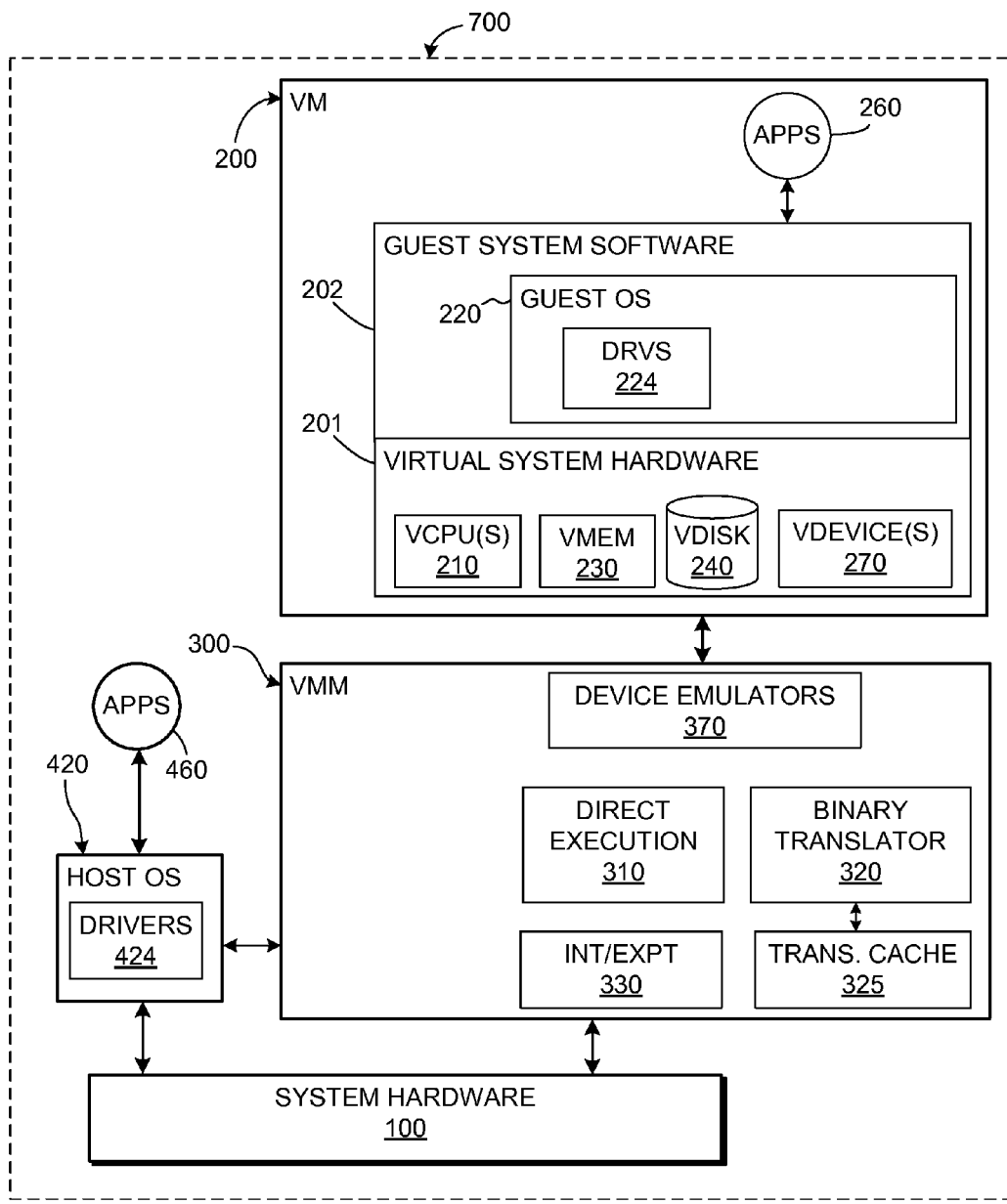
FIG. 2 (prior art) shows another example of a virtualized computer system in which the present invention can operate.

As described above, FIGS. 1 and 2 depict hosted and non-hosted implementations of virtualized computer systems. The invention is applicable at least to both such implementations of virtualized computer systems, as well as para-virtualized computer systems. For the purposes of illustration, an implementation of the invention is discussed involving the mapping of guest virtual memory to guest physical memory, which is in turn mapped to physical memory. This example has been chosen for the purposes of illustration and is not limiting. The invention may be beneficially implemented in any virtualized computer system having at least two abstraction layers for memory addressing. For example, in a hosted implementation, it is possible that the address space considered by the kernel 600 to be physical memory could in fact be virtual memory implemented by a host operating system, or potentially another virtualization layer running between the kernel 600 and the system hardware 100. In another embodiment, the guest physical memory can be managed by an alternative type of virtualization layer, such as a runtime environment or an emulator. One of skill in the art will recognize that the systems and methods described herein may be used with other potential memory address space configurations without departing from the scope of the present invention.

Figure 3:
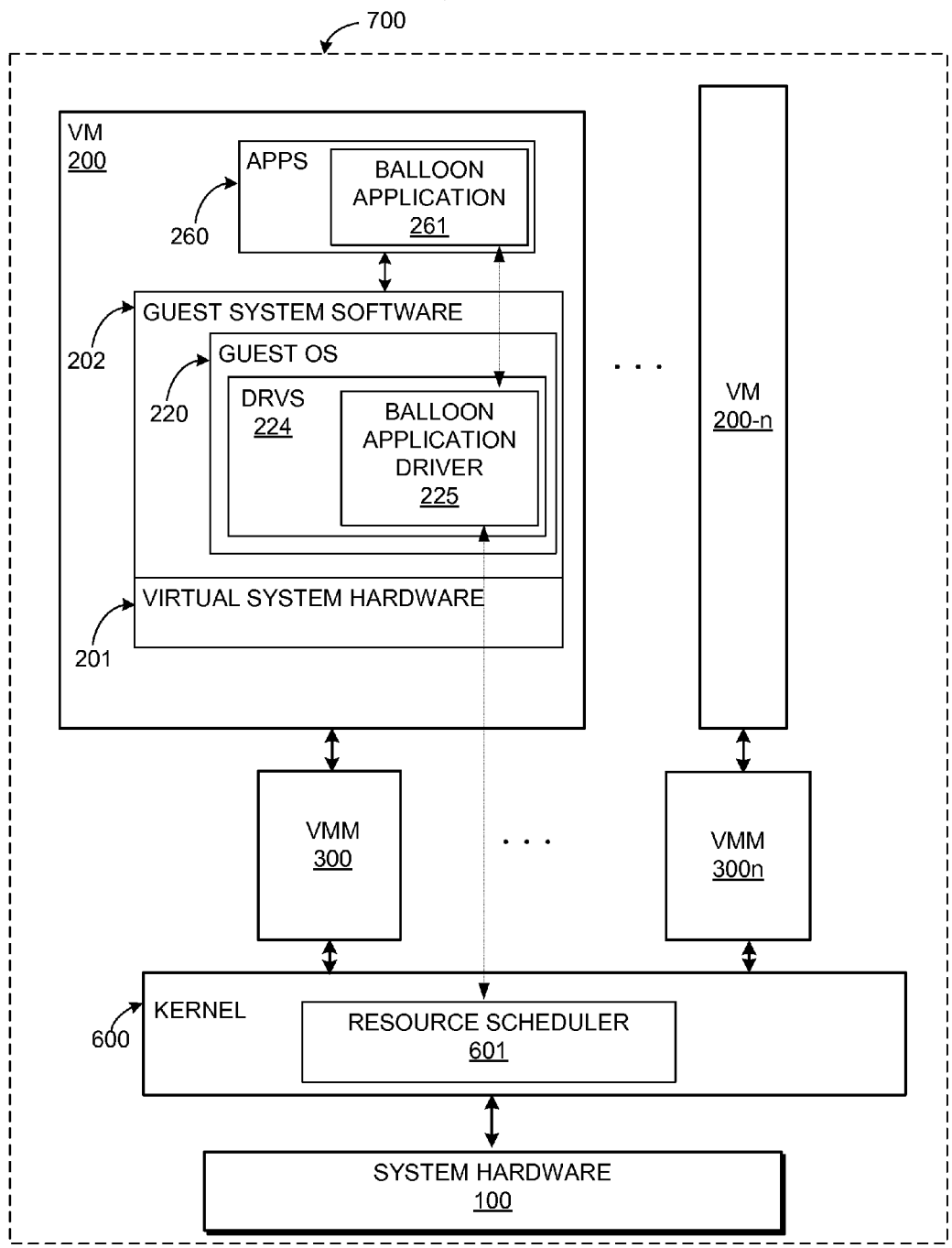
FIG. 3 illustrates a resource request application executing in a virtual machine, according to one embodiment of the present invention.

FIG. 3 illustrates a resource request application executing on a virtual machine, according to one embodiment of the present invention. A balloon application 261 executes as a guest application 260 on the virtual machine 200. According to one embodiment of the present invention, the balloon application 261 executes as a user-level application. The balloon application 261 is not privileged, and therefore cannot typically reserve arbitrary amounts of guest physical memory. According to another embodiment of the present invention, the balloon application 261 executes with special permissions, for example, by running in kernel mode, that allow it to perform certain actions not ordinarily permitted by user-level applications. A method used by the balloon application will be described herein with reference to FIG. 6.

According to one embodiment of the present invention, the guest operating system 220 also includes an optional balloon application driver 225. The balloon application driver 225 executes as a device driver within the guest operating system 220 and is capable of performing certain privileged actions. For example, the balloon application driver 225 may be able to reserve guest physical memory, to perform input/output instructions, to write to protected areas of guest physical memory, and to modify page tables. The balloon application driver 225 may also be capable of performing other actions typically performed by operating system device drivers.

According to one embodiment of the present invention, the balloon application 261 sends messages to the balloon application driver 225. The balloon application 261 may send messages to the balloon application driver 225 using a variety of methods. For example, the balloon application 261 can open a handle to a device managed by the balloon application driver 225. In a typical guest operating system 220, system calls to this device will be handled by the balloon application driver 225. As another example, the balloon application 261 can make an explicit driver call to the balloon application driver 225. Other methods will be apparent to one of skill in the art without departing from the scope of the present invention.

According to one embodiment of the present invention, the balloon application driver 225 sends messages to the balloon application 261. The balloon application driver 225 may send messages to the balloon application 261 using a variety of methods. For example, the balloon application driver 225 typically has direct access to guest physical memory. The balloon application driver 225 can communicate with the balloon application 261 by writing messages into the guest physical memory to which the guest virtual memory allocated to the balloon application 261 is mapped. As another example, the balloon application 261 can run in a sleep state, and the balloon application driver 225 can use synchronization primitives to "wake" the balloon application 261.

Outside of the virtual machine 200 is a resource scheduler 601. For the purposes of illustration, the resource scheduler 601 is shown as being contained in the kernel 600. However, the systems and methods ascribed herein to the resource scheduler 601 may be embodied in other components in the virtualization layer. For example, the resource scheduler 601 can be embodied entirely in the virtual machine monitor 300. As another example, the resource scheduler 601 can be embodied partially in the virtual machine monitor 300 and partially in the kernel 600. As yet another example, the resource scheduler 601 can be embodied in the host operating system of a paravirtualized machine. Other implementations for the resource scheduler 601 will be apparent to one of skill in the art without departing from the scope of the present invention.

The resource scheduler 601 manages the assignment of resources to the various virtual machines 200. One such resource is physical memory. According to one embodiment of the present invention, the resource scheduler 601 monitors the virtual machines' 200 usage of their respective guest physical memories to determine how much physical memory should be allocated to each virtual machine 200. The resource scheduler 601 may also take into account the relative priorities of the various virtual machines 200. The resource scheduler 601 may use a variety of methods to characterize the usage of a virtual machine's guest physical memory. The resource scheduler 601 may allocate more physical memory to virtual machines actively using a greater percentage of their guest virtual memory than virtual machines using a lower percentage of their guest virtual memory, for example using a method such as one of those described in "Proportional Share Resource Allocation with Reduction of Unproductive Resource Consumption'" U.S. patent application Ser. No. 09/952,796, filed Sep. 12, 2001, by Carl Waldspurger, which is hereby incorporated by reference in its entirety.

If the resource scheduler 601 determines that the amount of physical memory allocated to a virtual machine should be adjusted, the resource scheduler 601 may reclaim the physical memory using a variety of methods. For example, the resource scheduler 601 may page-out some of the guest physical memory to another storage device, effectively reducing the amount of physical memory allocated to the virtual machine. As another example, the resource scheduler 601 may reclaim some of the physical memory from the inside of the virtual machine by using the balloon application 261 to reduce the amount of guest physical memory used by the other applications 260. As another example the resource scheduler 601 may reclaim some of the physical memory from the inside of the virtual machine by using a device driver to reduce the amount of guest physical memory used by the applications 260. As yet another example, the resource scheduler 601 may reclaim the physical memory using any combination of methods described herein or known in the art. A method used by the resource scheduler 601 is described herein with reference to FIGS. 8, 11, and 13.

According to one embodiment of the present invention, the resource scheduler 601 reclaims guest physical memory by sending allocation parameters to the balloon application 261. According to one embodiment of the present invention, the resource scheduler 601 communicates with the balloon application 261 through the balloon application driver 225. The resource scheduler 601 may communicate with the balloon application driver 225 using a variety of methods. For example, the resource scheduler 601 and balloon application driver 225 may communicate through shared memory.

According to one embodiment of the present invention, communication between the resource scheduler 601 and the balloon application driver 225 is facilitated by the virtual machine monitor 300. For example, the virtual machine monitor 300 may trap on input/output calls, memory mapped input/output instructions, or special or undefined instructions from the balloon application driver 225 and forward these messages to the resource scheduler 601. As another example, the balloon application driver 225 can execute a hypercall (for example, in a paravirtualized system) requesting assistance from the virtual machine monitor 300. As another example, the balloon application driver 225 can execute a specialized call requesting hardware assistance. As yet another example, the virtual system hardware 201 can include a virtual device through which the balloon application driver 225 and the virtual machine monitor 300 can communication.

By operating in conjunction with the guest operating system 220 and having kernel permissions, the balloon application driver 225 may facilitate communication between the balloon application 261 and the resource scheduler 601. Furthermore, the balloon application driver 225 is also useful for determining the occurrence of guest virtual memory paging by the guest operating system 220.

For the purposes of illustration, the resource scheduler 601 is shown communicating with the balloon application driver 225 through the balloon application driver 225. According to one embodiment of the present invention, the balloon application 261 communicates with the resource scheduler 601 without the use of a balloon application driver. For example, the balloon application 261 can invoke the virtual machine monitor directly by executing special instructions, such as an instruction that is not defined in the instruction set architecture of the virtual CPU 210. The virtual machine monitor can trap these special instructions and pass messages to the resource scheduler 601. As another example, the resource scheduler 601 can send messages to the balloon application 261 through the virtual machine monitor by writing to shared memory, or by sending a special virtual interrupt. Other methods for communicating between the resource scheduler 601 and the balloon application 261 will be apparent to one of skill in the art without departing from the scope of the present invention.

Figure 4:
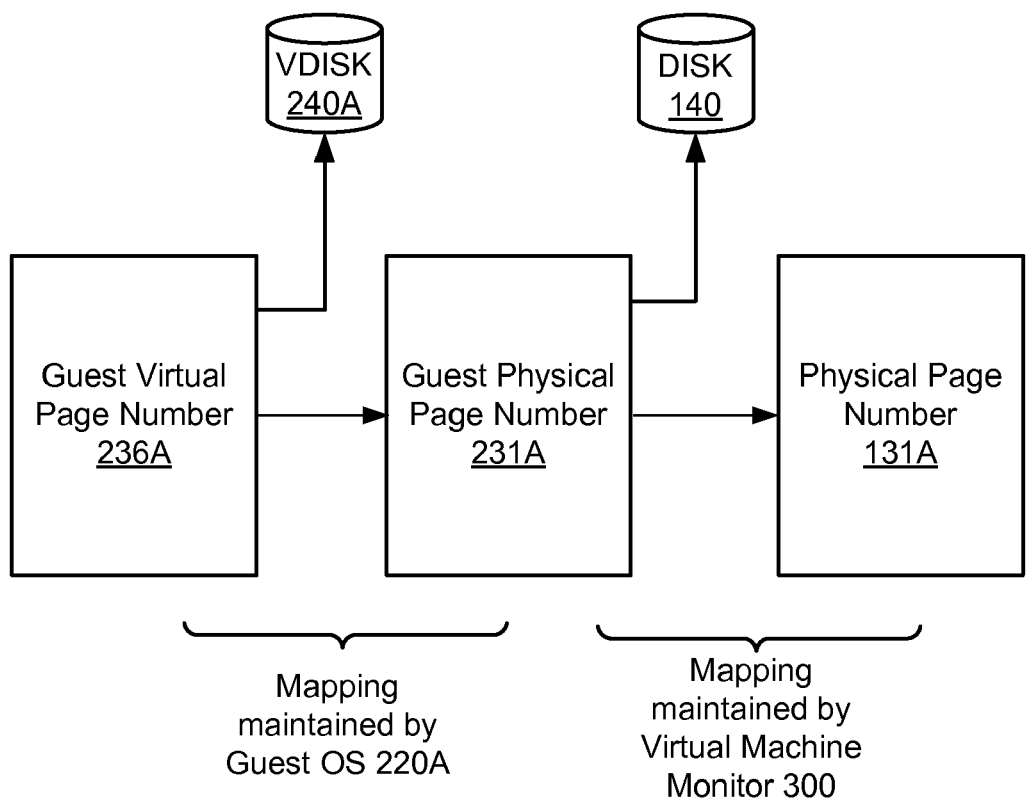
FIG. 4 illustrates a three address space memory mapping, according to one embodiment of the present invention.

FIG. 4 illustrates a three-level memory address space, according to one embodiment of the present invention. A memory addressing configuration having three levels of address spaces has been selected for the purposes of illustration as an example of configuration in which the invention may be usefully implemented. Moreover, the address spaces described herein, specifically, guest virtual memory, guest physical memory, and physical memory, are given for the purposes of illustration and are not limiting. Other configurations and examples of address spaces will be apparent to one of skill in the art without departing from the scope of the present invention.

When multiple address spaces are implemented, different memory addresses (to use a specific example of a "memory location") sometimes refer to the same place in the electronic storage. For example, the same bits in electronic storage may be described by a guest virtual memory address, a guest physical memory address, and a physical memory address. As another example, the same bits in electronic storage may be described by two distinct guest physical memory addresses. The number of addresses referencing a set of bits of electronic storage should not be confused with their innate storage capacity, which is generally fixed.

Typically, the relationships between addresses in one address space and the addresses in another address space are maintained in a page table. A page table is composed of page table entries. Each page table entry maps an address in the first address space to an address in the second address space. These addresses are described using page numbers. Thus, a page table entry might include a page number of a first address space and a corresponding page number of a second address space.

In the example illustrated in FIG. 4, and as mentioned above, memory addresses in the guest virtual memory address space are described by Guest Virtual Page Numbers (GVPNs), and memory addresses in the guest physical memory address space are described by Guest Physical Page Numbers (GPPNs). The guest operating system 220A maintains a page table mapping the GVPNs to GPPNs. If a guest virtual memory page has been paged-out, instead of mapping to a GPPN, its page table entry may map to a location on the virtual disk 240A (or may include some other indication that the page is not stored in guest physical memory). For example, a GVPN may be "unmapped'" and not map to either a valid GPPN or location on the virtual disk 240.

Similarly, memory addresses in the physical memory address space are described by Physical Page Numbers (PPNs). The virtual machine monitor 300 (or another component of the virtualization layer) maintains a data structure (such as a page table) mapping the GPPNs to PPNs. If a guest physical memory page has been paged-out, instead of mapping to a PPN, its page table entry may map to a location on the disk 140 (or may include some other indication that the page is stored on disk). As another case, a GPPN may be "unmapped'" and not map to either a valid PPN or location on the disk 140. Unmapped GPPNs are useful for reclaiming physical pages from a virtual machine, as described herein with reference to FIG. 5*b*.

In the example illustrated, a GVPN 236A is mapped to a GPPN 231A. The mapping of the GVPN 236A is maintained by the guest operating system 220A. The GPPN 231A is mapped to a PPN 131A. The mapping of the GPPN 231A is maintained by the virtual machine monitor 300.

The disk 140 has been shown as an example of a storage medium for storing paged-out data. This example has been chosen for the purposes of illustration and is not limiting. Other examples of media to which paged-out data can be stored include secondary caches, flash memory, network-attached storage, and so on. Other examples will be apparent to one of skill in the art without departing from the scope of the present invention. Similarly, the virtual disk 240 has been shown as an example of a virtual storage medium for storing paged-out data. This example has been chosen for the purposes of illustration and is not limiting. Other examples of real or virtual media to which paged-out data can be stored include secondary caches, flash memory, network destinations, and so on. Other examples will be apparent to one of skill in the art without departing from the scope of the present invention.

At each level of memory management abstraction, memory addresses may be treated as if they were tangible memory locations. For example, suppose a guest application writes data to a guest virtual memory location described by the GVPN 236A. To the guest application, this memory location is the destination in which the data will be written. However, at another layer of abstraction, the guest virtual memory location described by the GVPN 236A maps to a guest physical memory location described by the GPPN 231A. To the guest operating system 220A, this memory location is the destination in which the data will be written. But again, at yet another layer of abstraction, the guest physical memory location described by the GPPN 231A maps to a physical memory location described by the PPN 131A. The same write operation may have the appearance of writing to three memory locations—a guest virtual location, a guest physical location, and a physical location. However, in the example illustrated, the guest virtual location maps to the guest physical location, which maps to the physical location, so attempting to write to any of the three locations in fact results in the writing of data to the same physical location. A subsequent read from either the guest virtual location, the guest physical location, or the physical location (provided the various mappings are still in place) will return the data read from the physical location.

Figure 5A:
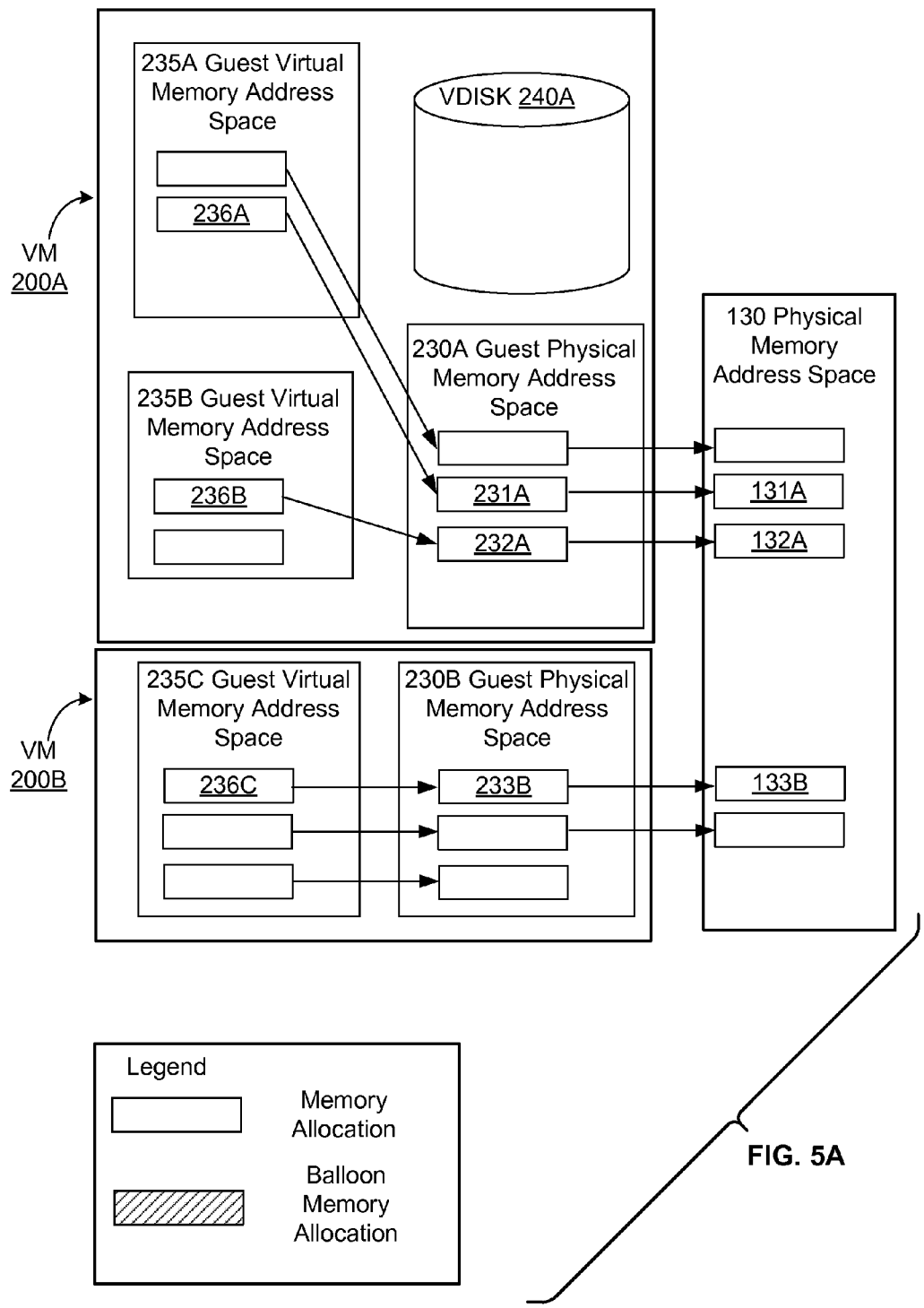
FIG. 5A illustrates use of a physical memory address space by two or more virtual machines, according to one embodiment of the present invention.

FIG. 5A illustrates use of a physical memory address space by two or more virtual machines, according to one embodiment of the present invention. In the example illustrated, virtual machine 200A includes guest virtual memory address space 235A and guest virtual memory address space 235B. While two guest virtual memory address spaces have been shown for the purposes of illustration, other numbers of guest virtual memory address spaces are commonly implemented in the virtual machines 200. The guest virtual memory address spaces map to a guest physical address space 230A. For example, the guest virtual memory address space 235A includes a guest virtual page number (GVPN) 236A, which maps to a guest physical page number (GPPN) 231A included in the guest physical memory address space 230A. Similarly, the guest virtual address space 235B includes a GVPN 236B which maps to a GPPN 232A in the guest physical address space 230A. As illustrated in the figure, multiple guest virtual memory address spaces may map to a single guest physical memory address space. Typically, this mapping is maintained by the guest operating system 220A.

Similarly, virtual machine 200B includes a guest virtual memory address space 235C. While only a single guest virtual memory address space is shown, the virtual machine 200B may contain any number of guest virtual memory address spaces. The guest virtual memory address space 235C maps to a guest physical memory address space 230B. For example, the guest virtual memory address space 235C includes a GVPN 236C which maps to a GPPN 233B in the guest physical memory address space 230B.

The guest physical memory address spaces 230 of the various virtual machines 200 map to the physical memory address space 130. For example, the guest physical memory address space 230A includes a GPPN 231A that maps to a PPN 131A. The guest physical memory address space 230A also includes a GPPN 232A that maps to a PPN 132A. Similarly, the guest physical memory address space 230B includes a GPPN 233B that maps to a PPN 133B. Typically, this mapping is maintained by the virtualization layer.

A guest application may store to and read from physical memory by using the guest virtual address. The guest virtual address includes a GVPN, for example the GVPN 236A. The application attempts to write to the page given by the GVPN 236A. A first page table, maintained by the guest operating system 220A, is used to determine the GPPN to which the GVPN is mapped, in this example the GPPN 231A. A second page table, maintained, for example, by the virtual machine monitor 300, is used to determine the PPN to which the GPPN is mapped, in this example the PPN 131A. The data to be stored by the guest application is then stored on the physical memory page given by PPN 131A.

As an added optimization, another page table may be maintained mapping the GVPNs directly to PPNs. Such an optimization may improve the efficiency of memory reads and writes by guest applications, as guest virtual addresses may be more directly translated to physical addresses.

In the example illustrated, the guest physical memory address spaces 230 include a total of six guest physical pages. However, the physical memory address space 130 includes a total of five physical pages, three of which are allocated to virtual machine 200A and two of which are allocated to virtual machine 200B. In the example illustrated, the total amount of memory in the guest physical memory address spaces is greater than the total amount of memory in the physical address space.

While the virtual machines have been illustrated as each having a single guest physical memory address space, a real or virtual machine could be implemented having a plurality of guest physical memory address spaces. Similarly, the computer system has been illustrated as having a single physical memory address space 130. A computer system could be implemented having a plurality of memory address spaces 130. Other memory addressing schemes will be apparent to one of skill in the art without departing from the scope of the present invention.

Figure 5B:
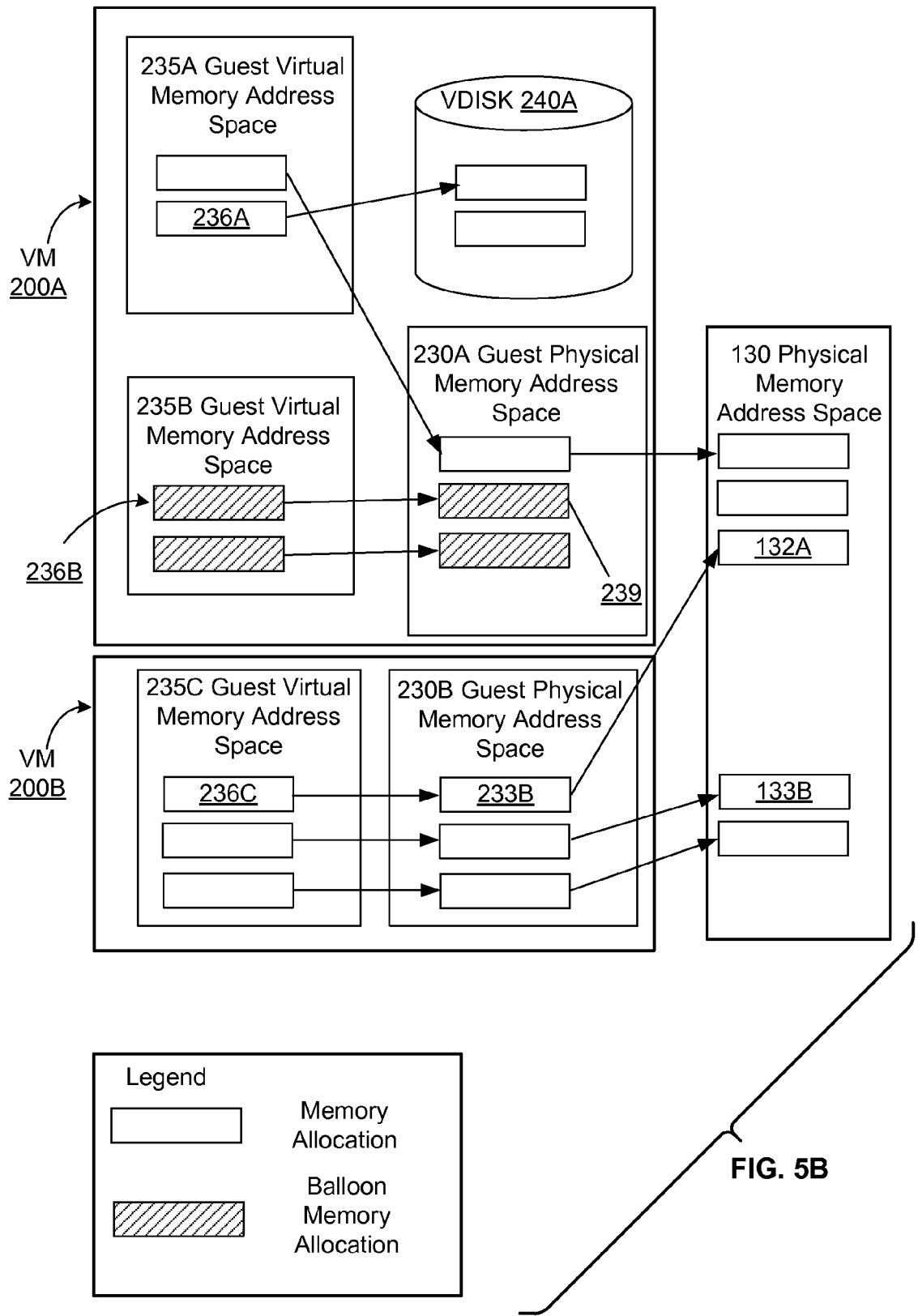
FIG. 5B illustrates executing a resource request application for reclaiming physical memory allocated to a virtual machine, according to one embodiment of the present invention.

FIG. 5B illustrates executing a resource request application for reclaiming physical memory allocated to a virtual machine, according to one embodiment of the present invention. FIG. 5A illustrated an example in which three physical pages were allocated to virtual machine 200A. FIG. 5B illustrates an example of how two of these physical pages can be reallocated by use of a balloon application.

A balloon application executes on top of the guest operating system 220A of virtual machine 200A. The balloon application requests some guest virtual memory, and the guest operating system 220A allocates at least one guest virtual page. In the example illustrated, the guest operating system 220A allocates two guest virtual pages in the guest virtual memory address space 235B to the balloon application. The balloon application accesses these memory locations (or otherwise causes them to be paged-in) and the guest operating system 220A maps the guest virtual pages to guest physical pages. For example, GVPN 236B is mapped to a GPPN 239 describing a location in the guest physical memory address space.

In order to accommodate the allocation (or paging-in of the allocation) of the guest virtual pages of the balloon application, the guest operating system 220A paged-out some of the guest virtual pages of the guest virtual memory address space 235A. For example, GVPN 236A now maps to a location in the virtual disk 240A. The GPPN to which GVPN 236A previously mapped is now available for a different GVPN. In the example illustrated, that GPPN is now mapped to by the GVPN 236B. In the example illustrated, the balloon application's guest virtual page allocation resulted in the paging-out of guest virtual pages allocated to other applications. In other cases, the balloon application's guest virtual page allocation can result in reductions to other kernel managed memory pages, such as a file buffer cache.

As one of the GVPNs allocated to the balloon application is mapped to the GPPN 239, the GPPN 239 may be safely paged-out by the resource scheduler 601. According to one embodiment of the present invention, the data in the PPN previously mapped to by the GPPN 239 may be copied to disk and the page table updated so that the GPPN 239 map to the location on disk in which the data was stored. Alternatively, the GPPN 239 may be unmapped, for example, by setting the GPPN 239 to map to a null value. As yet another alternative, the GPPN 239 may be set to map to a common (or "shared") PPN. By reducing the number of PPNs to which GPPNs map, PPNs may be freed and made available for allocation to other virtual machines.

In the example illustrated, the GPPN 239 is unmapped. FIG. 5B illustrates an embodiment referred to herein as an "unmapping method," because the GVPNs allocated to the balloon application 261 map to GPPNs which are not mapped to a valid PPN. Other examples of unmapping methods will be described herein with reference to FIGS. 10-12.

As the GPPNs do not map to valid PPNs, the PPN to which the GPPN 239 previously mapped can be reclaimed by the kernel and assigned to another virtual machine. For example, PPN 132A, which was previously mapped to by GPPN 232A, can now be assigned to virtual machine 200B. As shown in the figure, GPPN 233B now maps to PPN 132A. Another PPN, not labeled, is not mapped to by any GPPN, and is available for allocation or use by the resource scheduler 601. Thus unmapping methods are useful for reclaiming guest physical memory, and freeing physical memory for other uses.

Figure 5C:
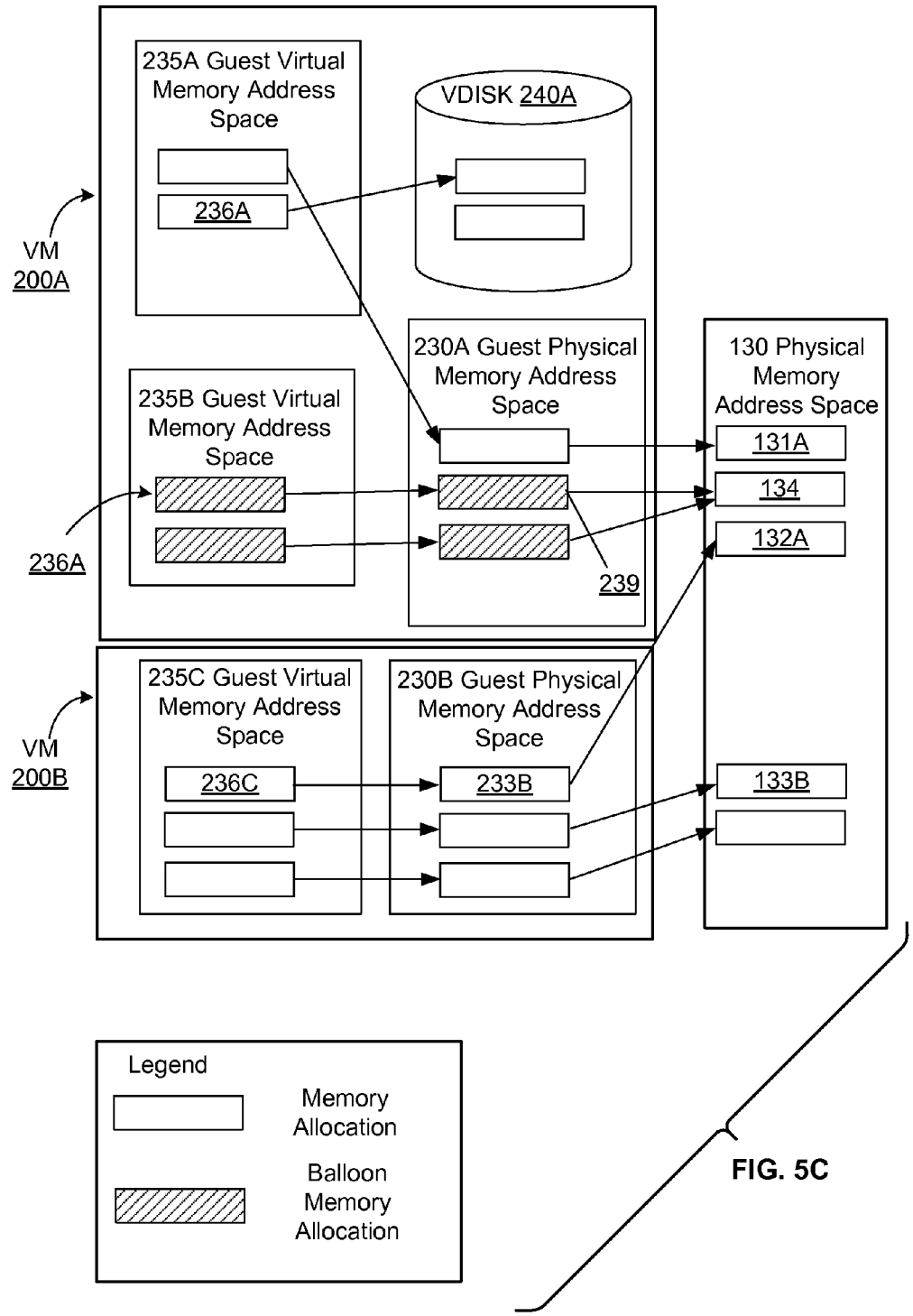
FIG. 5C illustrates another embodiment for the reclaiming of physical memory allocated to a virtual machine.

FIG. 5C illustrates another embodiment for the reclaiming of physical memory allocated to a virtual machine. As in FIG. 5B, some GVPNs allocated to the balloon application 261 map to GPPN 239. However, in the example illustrated in FIG. 5C, the GPPN 239 maps to a shared location in memory, PPN 134. FIG. 5C illustrates an embodiment referred to herein as a "page-sharing method," because the GVPNs allocated to the balloon application 261 map to GPPNs that map to a shared PPN. Other examples of page-sharing methods will be described herein with reference to FIGS. 7-9. Additional methods for page-sharing applicable to the present invention are described in "Content-Based, Transparent Sharing of Memory'" U.S. Pat. No. 6,789,156, to Carl Waldspurger, which is hereby incorporated by reference in its entirety.

As the GPPNs map to a shared PPN 134, the PPN to which the GPPN 239 previously mapped can be reclaimed by the kernel and assigned to another virtual machine. For example, PPN 132A, which was previously mapped to by GPPN 232A, can now be assigned to virtual machine 200B. As shown in the figure, GPPN 233B now maps to PPN 132A. Thus the page-sharing methods are useful for reclaiming memory in the guest physical memory address space, freeing up memory in the physical memory address space for other uses.

Figure 5D:
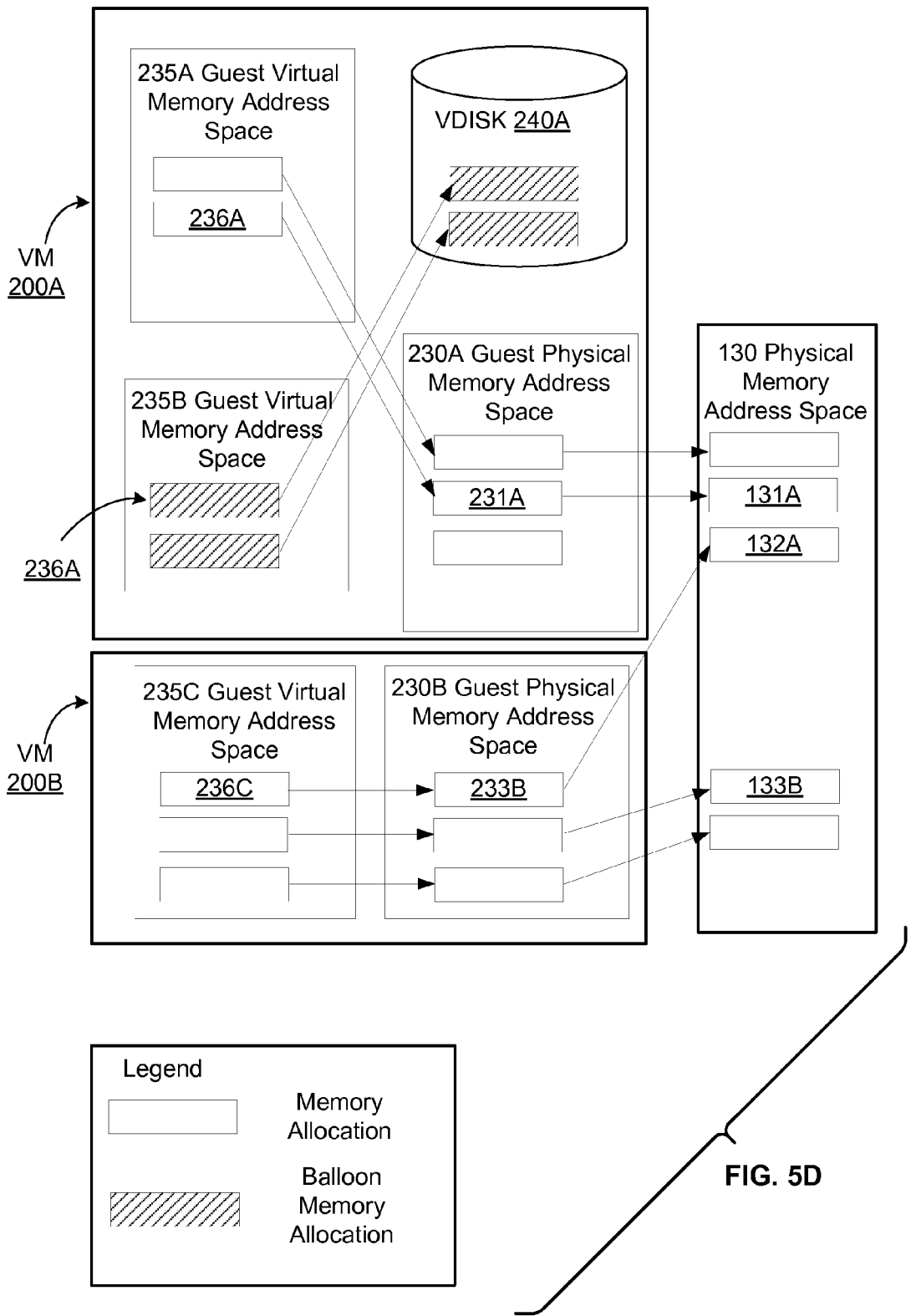
FIG. 5D illustrates reallocating physical memory to a virtual machine in response to the paging-out of guest virtual memory allocated to the resource request application.

FIG. 5D illustrates reallocating physical memory to a virtual machine in response to the paging-out of guest virtual memory allocated to a resource request application. As the balloon application is allocated guest virtual memory, the guest operating system 220A may page-out the virtual memory allocated to the balloon application. The guest operating system 220A may page-out the guest virtual memory allocated to the balloon application, for example, if it appears the guest virtual memory has not been accessed recently, if guest physical memory is tightly constrained, or if another application begins accessing large amounts of guest virtual memory.

In the example illustrated, the guest operating system 220A has paged-out the guest virtual memory allocated to the balloon application. The GVPNs of the balloon application now map to the virtual disk 240A. The GPPNs to which the GVPNs of the balloon application previously mapped are now mapped to by some other GVPNs. According to one embodiment of the present invention, the resource scheduler 601 maps these GPPNs to PPNs in preparation for their use by other guest applications, or by the guest operating system 220A.

When physical memory is constrained, memory management is an ongoing task. In the example illustrated, the balloon application was used to reclaim guest physical memory from virtual machine 200A. The resulting free physical memory could then be assigned to virtual machine 200B. However, when the guest operating system 220A paged-out the balloon application's allocation, the guest physical memory of virtual machine 200A effectively reexpanded. Though not illustrated, a subsequent step of the resource scheduler 601 might be an attempt to reclaim physical memory from other virtual machines, for example, by executing a balloon application in the virtual machine 200B. Thus a group of balloon applications could be used to cooperatively allocate and reclaim physical memory for various virtual machines in an ongoing cycle of give and take, and the physical memory requirements of the various virtual machines could be dynamically accommodated.

Figure 6:
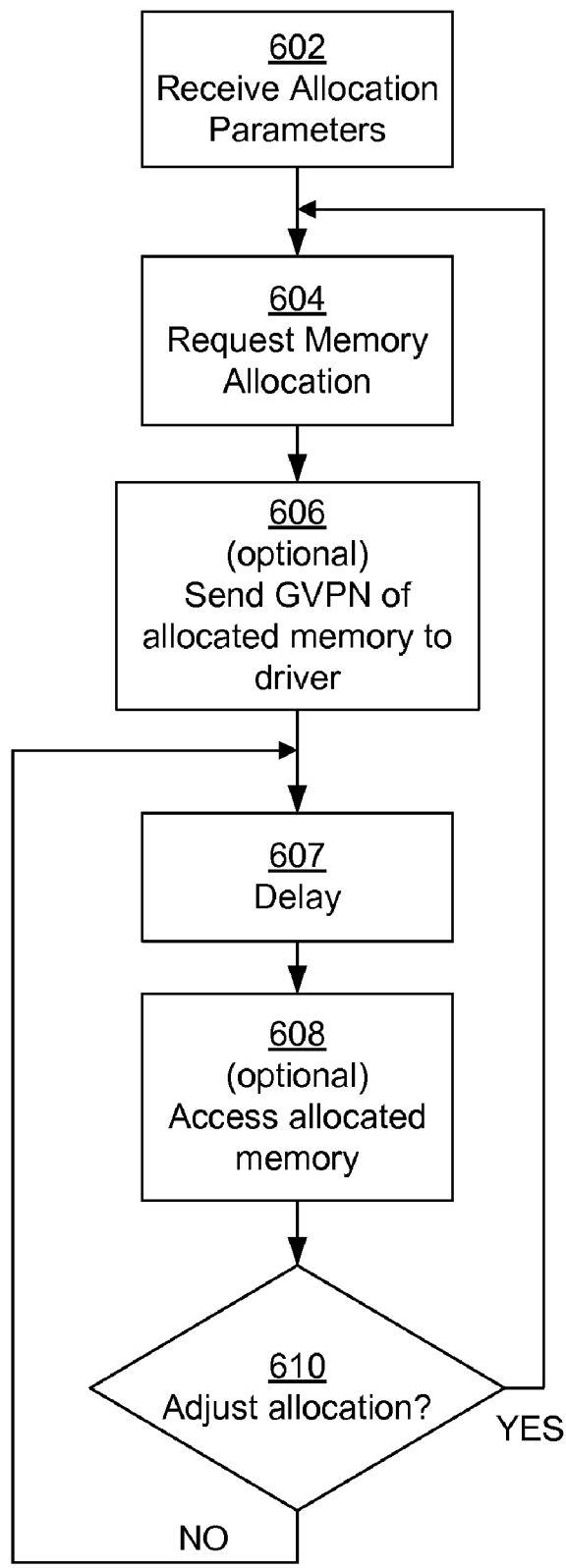
FIG. 6 illustrates a method used by a resource request application, according to one embodiment of the present invention.

FIG. 6 illustrates a method used by a resource request application, according to one embodiment of the present invention. According to one embodiment of the present invention, the method is used by the balloon application 261.

The balloon application 261 receives 602 allocation parameters. The allocation parameters describe the memory allocation to be requested by the balloon application 261. For example, the allocation parameters can include the size of the guest virtual memory allocation to be requested by the balloon application 261. According to one embodiment of the present invention, the allocation parameters further describe the frequency with which the balloon application 261 should access the allocated guest virtual memory. According to one embodiment of the present invention, the allocation parameters are sent from the resource scheduler 601, which is described in further detail herein with reference to FIG. 13.

The balloon application 261 requests 604 a memory allocation. According to one embodiment of the present invention, the balloon application 261 requests 604 a memory allocation, as described by the allocation parameters, from the guest operating system 220. The guest operating system 220 allocates a location in guest virtual memory described by at least one GVPN. According to one embodiment of the present invention, the balloon application 261 requests 604 multiple memory allocations.

According to one embodiment of the present invention, the balloon application 261 adjusts 604 a memory allocation. Adjusting 604 a memory allocation can include increasing or reducing the memory allocation of the balloon application 261. For example, if the allocation parameters indicate that the memory allocation of the balloon application 261 should be smaller, adjusting 604 a memory allocation can include freeing a guest virtual memory allocation previously allocated by the guest operating system 220. In many guest operating systems 220, guest virtual memory can be allocated and freed using memory management calls, such as mmap( ), munmap( ), mremap( ), malloc( ), free( ), or other library calls. These examples have been given for the purposes of illustration and are not limiting. Other various calls may be used in various operating systems without departing from the present invention.

The balloon application 261 optionally sends 606 the GVPN of the allocated guest virtual memory to the balloon application driver 225. According to one embodiment of the present invention, the balloon application 261 sends the GVPNs of the allocated guest virtual memory to the balloon application driver 225 to facilitate the efficient reclaiming of physical memory. According to one embodiment of the present invention, either instead of or in addition to sending 606 the GVPN of the allocated guest virtual memory to the balloon application driver 225, the balloon application 261 writes a predetermined value to the memory location (or range of memory locations) described by the GVPN. For example, the balloon application 261 can write a series of predetermined values to fill the page described by the GVPN. Writing a predetermined value to the page given by the GVPN is particularly useful in conjunction with a page-sharing method for guest physical memory reclamation, several of which are described herein with reference to FIGS. 7-9.

The balloon application 261 delays 607. According to one embodiment of the present invention, the balloon application 261 delays 607 for a predetermined amount of time. According to one embodiment of the present invention, the balloon application 261 delays 607 for an amount of time that is responsive to the received 602 allocation parameters.

The balloon application 261 optionally accesses 608 the allocated guest virtual memory. Accessing 608 the allocated guest virtual memory causes the guest operating system 220 to perceive that the GVPN of the allocated guest virtual memory is active, and furthermore, to page-in the allocated guest virtual memory if it has been previously paged-out by the guest operating system 220. According to one embodiment of the present invention, the balloon application 261 accesses only a subset of the allocated guest virtual memory. The amount of the allocated guest virtual memory to access can be prescribed, for example, in the allocation parameters.

The balloon application 261 determines 610 if the guest virtual memory allocation should be adjusted. According to one embodiment of the present invention, the balloon application 261 determines 610 if the guest virtual memory allocation should be adjusted by polling the balloon application driver 225. If the balloon application 261 determines that the guest virtual memory allocation should not be adjusted, the balloon application 261 returns to delay 607. If the balloon application 261 determines that the guest virtual memory allocation should be adjusted, the balloon application 261 returns to request 604 an updated memory allocation, requesting either the allocation of additional memory, or the deallocation of memory which had been previously allocated, as is appropriate.

For the purposes of illustration, the method has been showing using a polling implementation for communication between the balloon application 261 and the balloon application driver 225. According to another embodiment of the present invention, the balloon application 261 operates in a loop until it is receives new allocation parameters. For example, the balloon application 261 may block indefinitely on the delay 607 until the balloon application driver 225 wakes up the balloon application 261. As another example, the balloon application 261 may loop indefinitely over the delay 607 and the access 608, continuously accessing 608 the allocated guest virtual memory according to the frequency specified in the received 602 allocation parameters, until the balloon application driver 225 sends new allocation parameters to the balloon application 261. As yet another example, allocation parameters may be sent from the virtual machine monitor or the resource scheduler 601 through shared memory. Other methods will be apparent to one of skill in the art without departing from the scope of the present invention.

By executing a resource reservation application running as a guest application on the virtual machine, guest virtual memory may be reserved and effectively controlled by the virtualization layer. Manipulating guest virtual memory facilitates the effective management and allocation of physical memory to virtual machines.

According to one embodiment of the present invention, a plurality of balloon applications execute as guest applications 260 on the virtual machine 200. Executing multiple balloon applications is often useful for circumventing limitations imposed by the guest operating system 220. For example, some guest operating systems may organize the guest applications 260 into several partitions. Executing balloon applications in the various partitions allows for determining the memory conditions of the various partitions. As another example, in some computer systems, such as x86 computer systems using Physical Address Extension (PAE), a guest virtual memory address space may be smaller than the guest physical address space, thereby limiting the amount of guest virtual memory any one application can reserve. Executing multiple balloon applications facilitates the reservation of larger amount of guest virtual memory.

Figure 7:
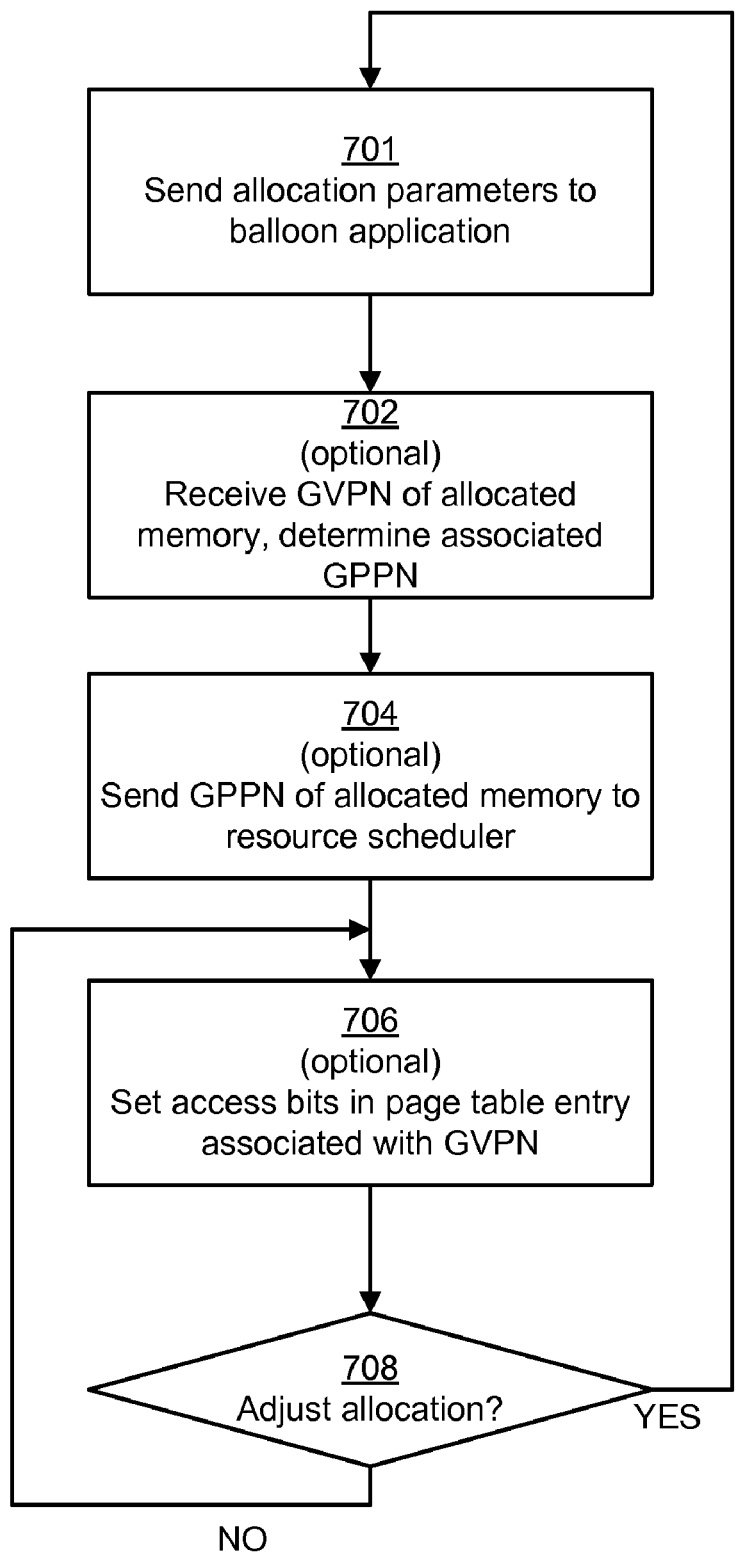
FIG. 7 illustrates a method for supporting a resource reservation application, according to one embodiment of the present invention.

FIG. 7 illustrates a method for supporting a resource reservation application, according to one embodiment of the present invention. According one embodiment, the method is performed by the balloon application driver 225. FIG. 7 illustrates a method useful in conjunction with a page-sharing method, such as one of those described herein with reference to FIG. 5C.

The balloon application driver 225 sends 701 allocation parameters to the balloon application 261. As described previously, the allocation parameters may contain prescriptions for the guest virtual memory allocation such as allocation size and frequency of allocation accesses. According to one embodiment of the present invention, the balloon application driver 225 sends 701 allocation parameters received from the resource scheduler 601.

The balloon application driver 225 optionally receives 702 a GVPN describing the guest virtual memory allocated to the balloon application 261. The balloon application driver 225 determines the GPPN to which the GVPN is mapped, for example, by calling to the guest operating system 220 for translation of the GVPN.

The balloon application driver 225 optionally sends 704 the GPPN to the resource scheduler 601. According to one embodiment of the present invention, the GVPN is mapped to a GPPN, and this GPPN is sent from the balloon application driver 225 to the resource scheduler 601. Such a technique may beneficially improve the efficiency with which the GPPN allocated to the balloon application 261 is identified and increase the ability of the resource scheduler 601 to free physical memory allocated to the virtual machine.

The balloon application driver 225 optionally sets an access bit 706 in the page table entry mapping the GVPN to the GPPN. Many guest operating systems 220 use the access bit of the page table entry to determine which pages are active and which are inactive. For example, reading from a virtual memory location associated with a GVPN will set the access bit in the page table entry mapping the GVPN to the GPPN. According to one embodiment of the present invention, the balloon application driver 225 sets the access bit 706 directly, avoiding the step of reading from the virtual memory location. According to another embodiment of the present invention, the access bits are set by the virtual machine monitor. By setting the access bit 706, the guest operating system 220 will perceive that the GVPN is active. The frequency with which the access bit is set 706 may be determined by the allocation parameters.

The balloon application driver 225 determines 708 if the allocation parameters should be adjusted. For example, the balloon application driver 225 may determine 708 if the allocation parameters should be adjusted based on communication with the resource scheduler 601. If the balloon application driver 225 determines 708 that the allocation parameters should be adjusted, the balloon application driver 225 returns to send 701 the new application parameters to the balloon application 261. If the balloon application driver 225 determines 708 that the allocation parameters should not be adjusted, the balloon application driver 225 returns to set the access bit 706.

For the purposes of illustration, the balloon application driver 225 has been shown as operating in a polling method in which the balloon application driver 225 periodically consults the resource scheduler 601 to determine 708 if the allocation parameters should be adjusted. According to one embodiment of the present invention, the balloon application driver 225 operates in an interrupt driven method. The balloon application driver 225 receives virtual interrupts sent by the resource scheduler 601 and handles those interrupts appropriately. For example, upon receiving a virtual interrupt, the balloon application driver 225 receives new allocation parameters by reading from a guest physical memory location or by executing input/output instructions.

Executing a device driver, such as the balloon application driver 225, facilitates communication between the balloon application and the resource scheduler, for example. Furthermore, the balloon application driver 225 may improve the efficiency of the balloon application 261 by providing virtualized accesses to allocated virtual memory.

Figure 8:
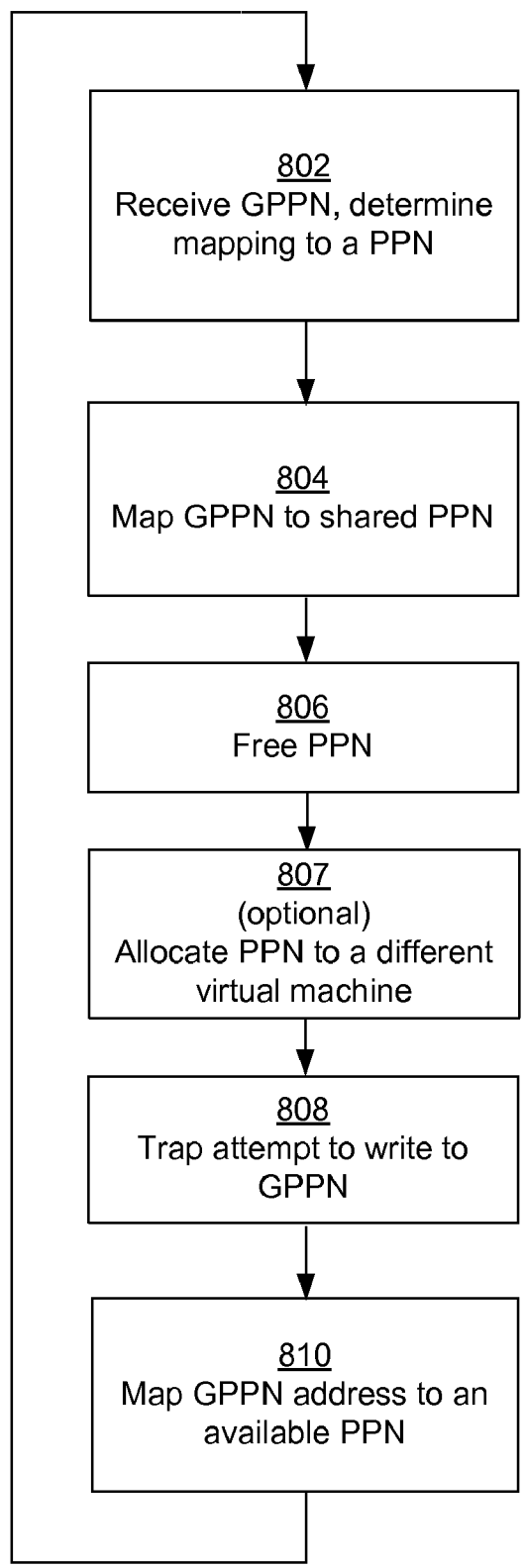
FIG. 8 illustrates a method managing memory resources, according to one embodiment of the present invention.

FIG. 8 illustrates a method managing memory resources, according to one embodiment of the present invention. In one embodiment, the method is performed by the resource scheduler 601. FIG. 8 illustrates a method useful in conjunction with a page-sharing method, such as one of those described herein with reference to FIG. 5C.

The resource scheduler 601 receives 802 a GPPN. The received 802 GPPN is mapped to by a GVPN. According to one embodiment of the present invention, the resource scheduler 601 determines if the GVPN (which maps to the received 802 GPPN) is allocated to the balloon application 261 by searching the page for predetermined data. The search for pages containing predetermined data may be performed by iterating over GPPNs. For example, the resource scheduler 601 receives 802 a GPPN from the virtual machine monitor. The resource scheduler 601 determines the PPN to which the GPPN is mapped. The resource scheduler 601 reads data from the physical page, and determines if the physical page contains predetermined data (for example, the predetermined data written to the page by the balloon application 261.) If the resource scheduler 601 determines that the physical page does not contain a predetermined value, the resource scheduler 601 returns to receives 802 another GPPN from the virtual machine monitor. If the resource scheduler 601 determines that the physical page does contain a predetermined value, the resource scheduler 601 has identified a GPPN associated with a GVPN allocated to the balloon application 261. By searching for predetermined values in memory, the resource scheduler 601 may identify guest physical pages eligible for page sharing without the explicit transfer of GPPNs.

According to another embodiment of the present invention, a GPPN associated with a GVPN allocated to the balloon application 261 is sent to the resource scheduler 601 by the balloon application driver 225. (See step 704 described herein with reference to FIG. 7.) The resource scheduler 601 receives a GPPN from the balloon application driver 225 (possibly through the assistance of the virtual machine monitor). The resource scheduler 601 determines the PPN to which the GPPN is mapped, for example, using the page table (or another page mapping data structure) maintained by the resource scheduler 601. By receiving a GPPN associated with a GVPN allocated to the balloon application 261, the resource scheduler 601 may efficiently identify physical pages eligible for page sharing.

The resource scheduler 601 maps 804 the GPPN to a shared PPN. For example, the resource scheduler 601 can change the page table entry for the GPPN so that it no longer maps to the PPN determined in 802 and instead maps to a second PPN. This second PPN may be shared in the sense that is has multiple GPPNs mapping to it. Alternatively, this second PPN may only have a single GPPN mapping to it, but is eligible to have other GPPNs map to it in subsequent mappings 804.

The resource scheduler 601 frees 806 the first PPN. As the GPPN no longer maps to the first PPN, the first PPN can be marked as unused and enter a pool of available PPNs.

The resource scheduler 601 optionally allocates 807 the freed PPN to a different virtual machine. Alternatively, the resource scheduler 601 can use the freed PPN for other purposes. For example, the resource scheduler 601 can store kernel data in the memory designated by the freed PPN, or can maintain the available physical memory for future use.

As long as the guest operating system 220 maps the balloon application's GVPN to the same GPPN, the mapping of the GPPN to the shared PPN will beneficially reduce the total amount of physical memory used by the virtual machine. However, as the balloon application 261 is allocated guest virtual memory, it is the possible that the guest operating system 220 may page-out the balloon application's guest virtual page and map some other GVPN to the GPPN. This other guest virtual page may be allocated to another guest application, or to the guest operating system itself. From the point of view of the resource scheduler 601, this arrangement is acceptable up until the time that the other guest application attempts to write to the GVPN mapped to the GPPN.

The resource scheduler 601 traps 808 the attempt to write to the GPPN. According to one embodiment of the present invention, the resource scheduler 601 may trap 808 the attempt to write the GPPN by marking the GPPN as read-only in the hardware page table, which will cause an exception when a write is attempted.

The resource scheduler 601 maps 810 the GPPN to an available PPN. The available PPN may be taken from a pool of available physical memory pages, or it may be acquired by mapping some other GPPN to a shared PPN. The GPPN is mapped to an available PPN, and the write to that GPPN may continue as normal.

At some time later, the balloon application's GVPN will be paged-in. For example, the balloon application 261 may be periodically accessing the guest virtual memory allocated to it, and if the GVPN is paged-out this access will create a page fault, causing the guest operating system 220 to page-in the GVPN and map it to a (possibly different) GPPN. According to one embodiment of the present invention, the balloon application driver 225 will detect the page-in and send the new GPPN to the resource scheduler 601. According to another embodiment of the present invention, the page-in by the guest operating system 220 will copy the predetermined data (previously written by the balloon application 261) to a new location in memory. The resource scheduler 601 returns to receiving 802 a GPPN, and begins the process of freeing another PPN as a result of the page-in of the balloon application's guest virtual page.

Figure 9:
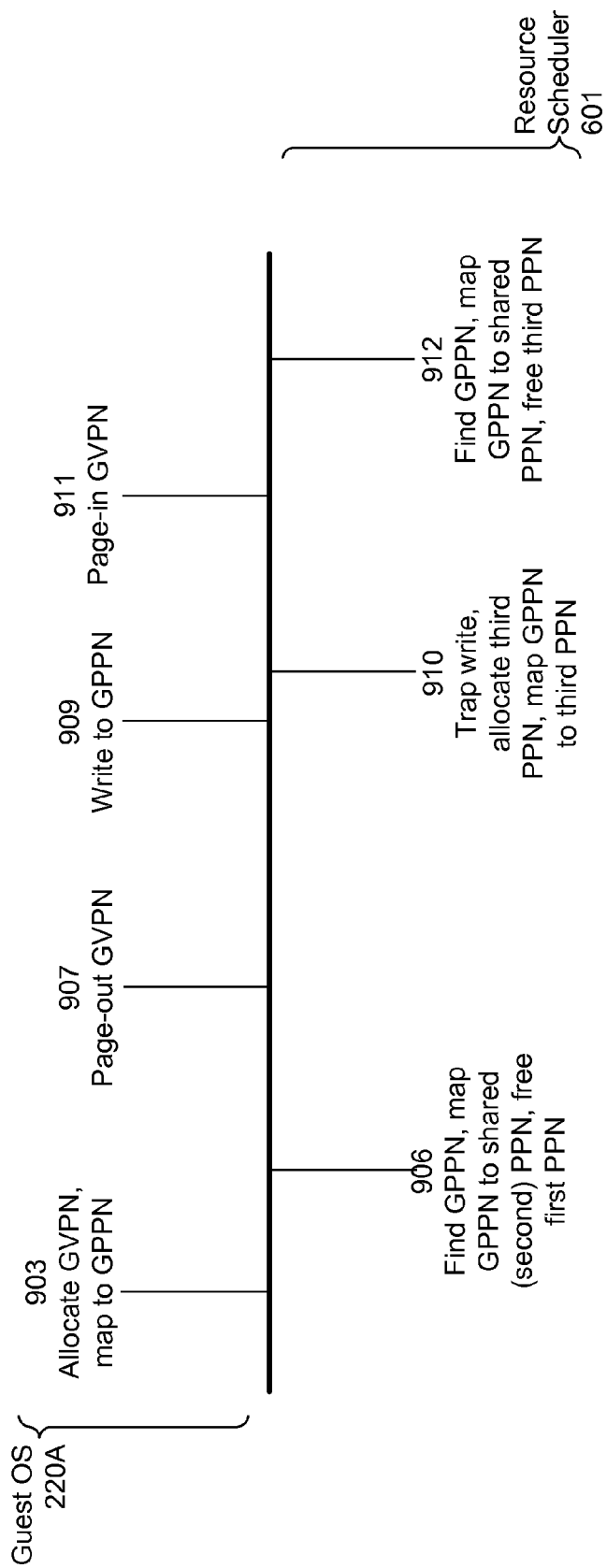
FIG. 9 illustrates a method for reclaiming physical memory, according to one embodiment of the present invention.

FIG. 9 illustrates a method for reclaiming physical memory assigned to a virtual machine, according to one embodiment of the present invention. FIG. 9 shows an exemplary timeline along with steps performed by the guest operating system 220 and the resource scheduler 601 in one of the embodiments employing a page-sharing method.

The guest operating system 220 allocates 903 a GVPN and maps the GVPN to a GPPN. Typically the guest operating system 220 allocates 903 a GVPN in response to a request for memory by the balloon application 261. The guest operating system 220 may map the GVPN to a GPPN either upon the allocation of the GVPN, or in response to a write or read to the GVPN. The GPPN in turn is mapped to a first PPN.

According to one embodiment of the present invention, the balloon application 261 writes a predetermined value into the memory location (or range of memory locations) described by the GVPN. For example, the balloon application 261 can write a series of predetermined values to fill the page described by the GVPN.

The resource scheduler 601 finds 906 the GPPN to which the GVPN is mapped. According to one embodiment of the present invention, the resource scheduler 601 finds 906 the GPPN to which the GVPN is mapped by searching for a predetermined value. The resource scheduler 601 then modifies (for example, with the help of the virtual machine monitor 300) the page table mapping of that GPPN, and maps the GPPN to a shared (second) PPN. The first PPN is then free, and can be assigned to other virtual machines.

The guest operating system 220 pages-out 907 the GVPN allocated to the balloon application 261. A different GVPN, possibly not allocated to the balloon application 261, is now mapped to the GPPN.

The guest operating system 220 writes 909 to the GPPN.

The resource scheduler 601 traps 910 the write to the GPPN, and breaks the mapping of the GPPN to the shared (second) PPN. An available PPN (a third PPN) is allocated to the virtual machine, and the GPPN is mapped to the third PPN. According to one embodiment of the present invention, the resource scheduler 601 blocks the virtual machine until a PPN can be reclaimed and allocated. After the GPPN has been mapped to the third PPN, the guest operating system 220 write to the GPPN continues as normal.

The guest operating system 220 pages-in 911 the GVPN allocated to the balloon application 261. The GVPN is now mapped to a (possibly different) GPPN.

The resource scheduler 601 finds 912 the GPPN to which the GVPN allocated to the balloon application 261 is mapped. The resource scheduler 601 then modifies (for example, with the help of the virtual machine monitor 300) the page table mapping of that GVPN, and changes the mapping from the third PPN to a shared PPN. The third PPN is then free, and can be assigned to other virtual machines. Thus the pattern may continue, with the guest operating system 220 repeatedly paging-in and paging-out the guest virtual memory allocated to the balloon application 261, and the resource scheduler 601 repeatedly freeing PPNs containing predetermined values and trapping writes to the shared PPN. By consolidating physical pages containing the same data, physical memory usage may be reduced. Therefore, writing predetermined data into memory allocated to the balloon application 261 facilitates the reclaiming of physical memory assigned to a virtual machine.

Figure 10:
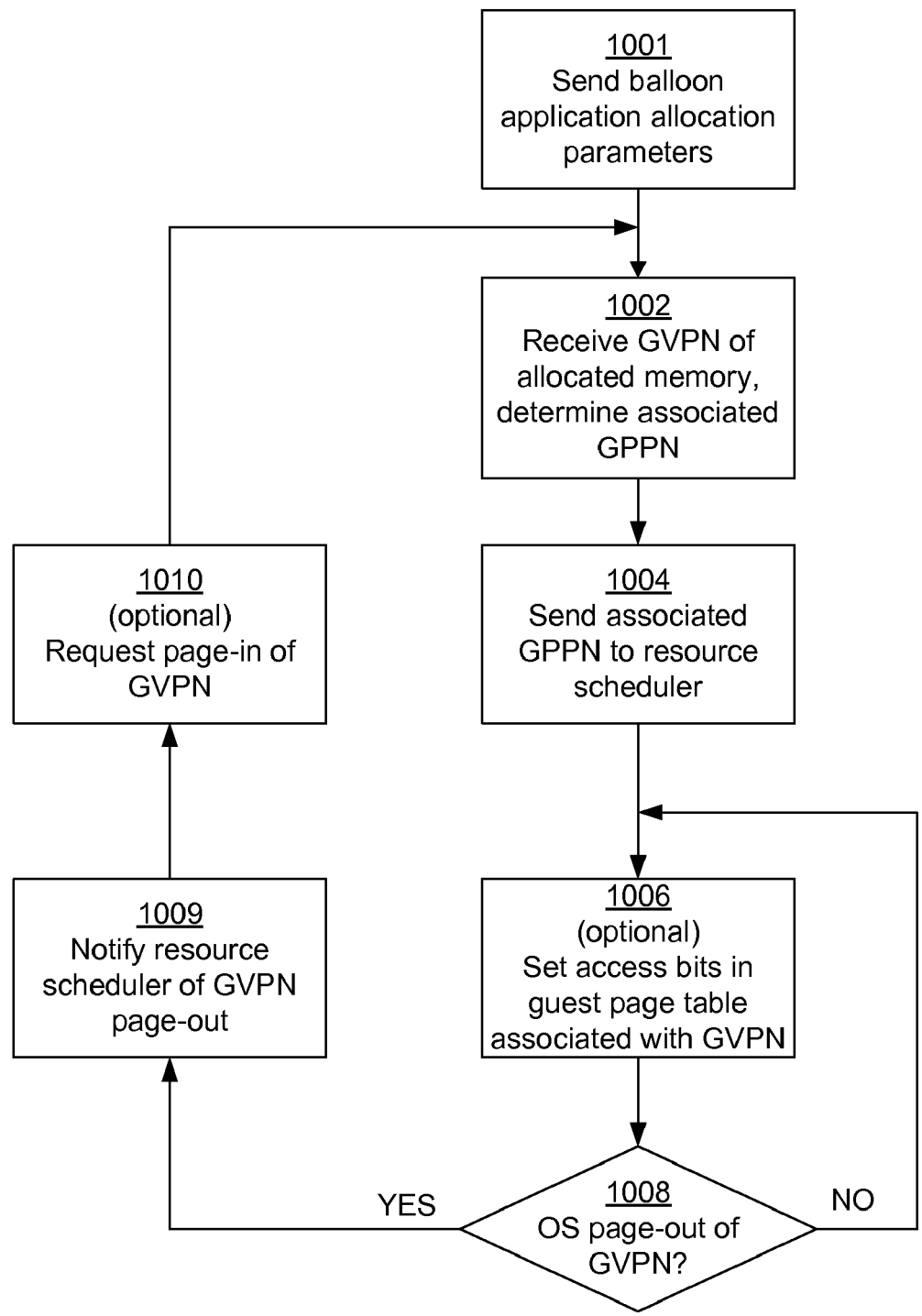
FIG. 10 illustrates a method for supporting a resource reservation application, according to another embodiment of the present invention.

FIG. 10 illustrates a method for supporting a resource reservation application, according to another embodiment of the present invention. According one embodiment, the method is performed by the balloon application driver 225. FIG. 10 illustrates a method useful in conjunction with an unmapping method, such as one of those described herein with reference to FIG. 5B.

The balloon application driver 225 sends 1001 allocation parameters to the balloon application 261. The allocation parameters sent 1001 by the balloon application driver 225 may be received from the resource scheduler 601. As in the method described herein with reference to FIG. 7, the balloon application driver 225 may serve as a communication link between the balloon application 261 and the resource scheduler 601.

The balloon application driver 225 receives 1002 the GVPN of the guest virtual memory allocated to the balloon application 261, and determines the GPPN to which it is mapped. According to one embodiment of the present invention, the balloon application driver 225 receives a GVPN from the balloon application 261, and calls to the guest operating system 220 to deference the GVPN to a GPPN. According to another embodiment of the present invention, the virtual machine monitor translates the GVPN to a GPPN by consulting the guest page table.

The balloon application driver 225 sends 1004 the GPPN (to which the received 1002 GVPN is mapped) to the resource scheduler 601.

The balloon application driver 225 optionally sets an access bit 1006 in the page table entry mapping the GVPN to the GPPN. Many guest operating systems 220 use the access bit of the page table entry to determine which pages are active and which are inactive. For example, reading from a virtual memory location associated with a GVPN will set the access bit in the page table entry mapping the GVPN to the GPPN. According to one embodiment of the present invention, the balloon application driver 225 sets the access bit 1006 directly, avoiding the step of reading the virtual memory allocation. By setting the access bit 1006, the guest operating system 220 will perceive that the GVPN is active. The frequency with which the access bit is set 1006 may be determined by the allocation parameters.

According to one embodiment of the present invention, the balloon application driver 225 sets a dirty bit in the page table entry mapping the GVPN to the GPPN. A dirty bit indicates to the guest operating system 220 that the page has been modified since it was last written to disk. Thus setting the dirty bit will cause the guest operating system 220 to copy the page to disk when paging out the GVPN, assisting the balloon application driver 225 with detection of the page-out.

The balloon application driver 225 determines 1008 if the guest operating system 220 has paged-out the balloon application's GVPN. The balloon application driver 225 can determine 1008 if the guest operating system 220 has paged-out the balloon application's GVPN using a variety of methods. For example, when the balloon application 261 requests the guest virtual memory from the guest operating system 220, it may indicate to the guest operating system 220 that the memory is associated with a device (real or virtual) for which the balloon application driver 225 is responsible. In this case, many guest operating systems 220 will call to the balloon application driver 225 when paging-out the virtual memory, providing the balloon application driver 225 with the opportunity to catch the page-out. In some cases, the balloon application driver 225 will be responsible for performing the page-out, advantageously increasing efficiency by avoiding costly virtual disk writes by the guest operating system 220.

The virtualization layer has other opportunities in which to trap the page-out by the guest operating system 220. For example, typically the virtual machine monitor will be involved in accesses to the virtual disk 240. As the guest operating system 220 will typically page-out guest virtual memory using the virtual disk 240, the virtual machine monitor may catch the write to the virtual disk 240 and notify the balloon application driver 225 of the page-out.

As yet another alternative, the virtual machine monitor may mark as read-only the memory containing the page table mapping the GVPNs to GPPNs. Page-outs will typically involve a change to this page table by the guest operating system 220. When the guest operating system 220 attempts to write to the page table, the virtual machine monitor can trap the write and notify the balloon application driver 225 of the page-out. According to another embodiment of the present invention, the virtual machine monitor can trap a write to the page table and notify the resource scheduler 601 directly.

These examples of methods for determining if the guest operating system 220 has paged-out the guest virtual memory allocated to the balloon application 261 are given for the purposes of illustration only and are not limiting. Other methods for determining page-out by the guest operating system 220 will be apparent to one of skill in the art without departing from the scope of the present invention.

If the balloon application driver 225 determines 1008 that the guest operating system 220 has not paged-out the GVPN allocated to the balloon application 261, the balloon application driver 225 optionally returns to setting the access bit 1006.

If the balloon application driver 225 determines 1008 that the guest operating system 220 has paged-out the GVPN allocated to the balloon application 261, the balloon application driver 225 notifies the resource scheduler 601 that the GVPN allocated to the balloon application 261 has been paged-out. For the purposes of illustration the balloon application driver 225 is shown as notifying 1009 the resource scheduler 601 in response to the determination 1008, but according to one embodiment of the present invention the resource scheduler 601 may wait until the guest operating system 220 attempts to write to the GP PN before notifying 1009 the resource scheduler 601.

The resource scheduler 601 optionally requests 1010 page-in of the GVPN. The resource scheduler 601 can request 1010 page-in of the GVPN, for example, by calling to the guest operating system 220 for translation of the GVPN. If the GVPN is paged-out, this call will typically result in a page fault, and the guest operating system 220 will page-in the GVPN.

According to one embodiment of the present invention, the resource scheduler 601 requests 1010 page-in of the GVPN according to a frequency described in the allocation parameters. According to another embodiment of the present invention, the resource scheduler 601 requests 1010 page-in of the GVPN in response to determining 1008 that the guest operating system 220 has paged-out the GVPN. According to yet another embodiment of the present invention, the resource scheduler 601 requests 1010 page-in of the GVPN in response to a command from the resource scheduler 601. By explicitly calling to the guest operating system 220 for a page-in, the balloon application driver 225 may control the frequency of the page-in of the GVPN.

Figure 11:
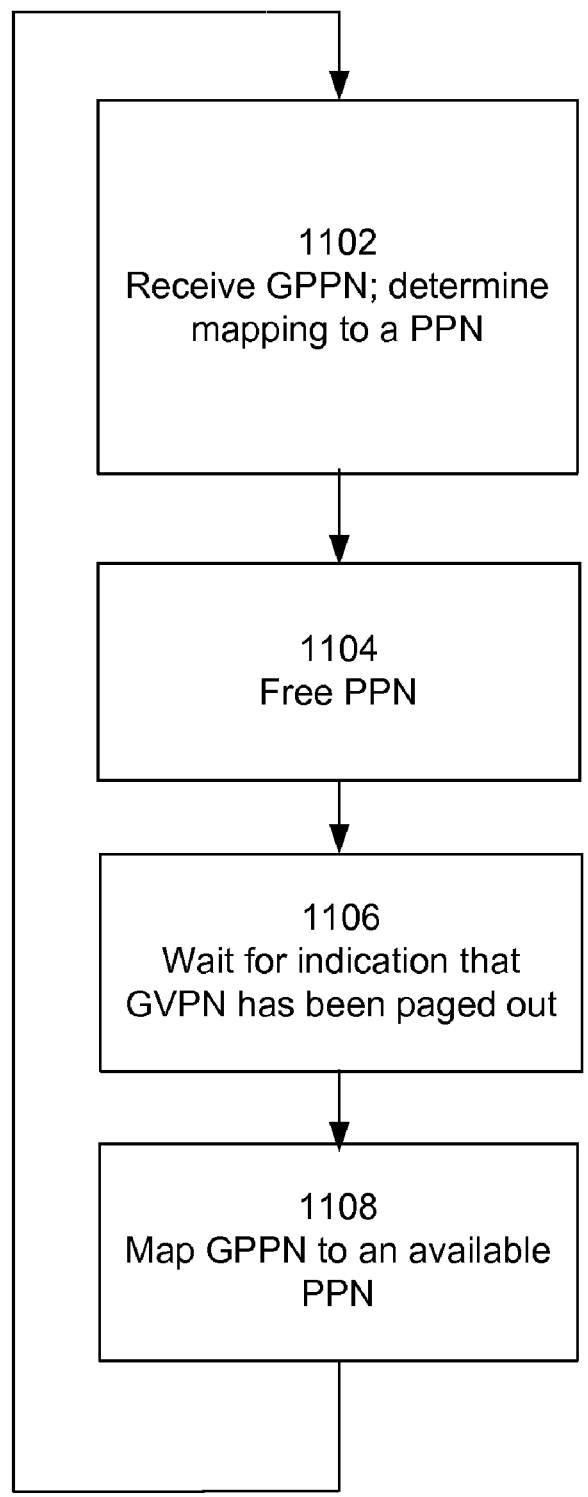
FIG. 11 illustrates a method managing memory resources, according to another embodiment of the present invention.

FIG. 11 illustrates a method for managing memory resources, according to another embodiment of the present invention. In one embodiment, the method is performed by the resource scheduler 601. FIG. 11 illustrates a method useful in conjunction with an unmapping method, such as one of those described herein with reference to FIG. 5B.

The resource scheduler 601 receives 1102 a GPPN. According to one embodiment of the present invention, the resource scheduler 601 receives 1102 a GPPN from the balloon application driver 225. The resource scheduler 601 determines the PPN to which the GPPN is mapped, for example, by consulting the page table (or another page mapping data structure) maintained by the resource scheduler 601.

The resource scheduler 601 frees 1104 the PPN to which the GPPN is mapped. For example, the resource scheduler 601 can allocate the PPN to a pool of available PPNs. According to one embodiment of the present invention, the resource scheduler 601 can assign the PPN to another virtual machine.

According to one embodiment of the present invention, the resource scheduler 601 changes the page table entry for the GPPN to indicate that the GPPN is unmapped. For example, the resource scheduler 601 can map the GPPN to map to a predetermined invalid PPN, can set the GPPN so that it does not map to any PPN, or can set a separate field indicating that the GPPN is not mapped to a PPN. Other methods will be apparent to one of skill in the art without departing from the scope of the present invention.

The resource scheduler 601 waits 1106 for an indication that the GVPN allocated to the balloon application 261 has been paged-out. For example, the resource scheduler 601 can wait 1106 for an indication that the GVPN has been paged-out by periodically polling the balloon application driver 225, or by waiting for a message from the balloon application driver 225 indicating a page-out of the GVPN.

The resource scheduler 601 maps 1108 the GPPN to an available PPN. According to one embodiment of the present invention, the resource scheduler 601 allocates an available PPN and changes the page table entry for the GPPN to map to the allocated PPN. Typically, the resource scheduler 601 maps 1108 the GPPN to an available PPN when the guest operating system 220 has paged-out the GVPN allocated to the balloon application 261. When some other GVPN (potentially allocated to some other guest application) is mapped to the GPPN, the GPPN is mapped to an available PPN. The memory allocation will thus behave as expected by the other guest application. The resource scheduler 601 returns to receives 1102 another GPPN.

For the purposes of illustration, the resource scheduler 601 has been shown to allocate an available PPN in response to the GVPN page-out message from the balloon application driver

225. According to another embodiment of the present invention, an available PPN is allocated in response to a detected attempt to write to a GPPN (for example, as shown in FIG. 9), and the GVPN page-out message is used to determine memory conditions inside the virtual machine.

By freeing and allocating physical pages as directed by the balloon application driver 225, the resource scheduler 601 facilitates the reclaiming of physical memory from virtual machines while at the same time ensuring that the memory allocations of other guest applications behave normally.

According to another embodiment of the present invention, the resource scheduler 601 maps 1108 to an available PPN in response to detecting an attempted write (for example by the guest operating system 220 or by another guest application) to the GPPN.

Figure 12:
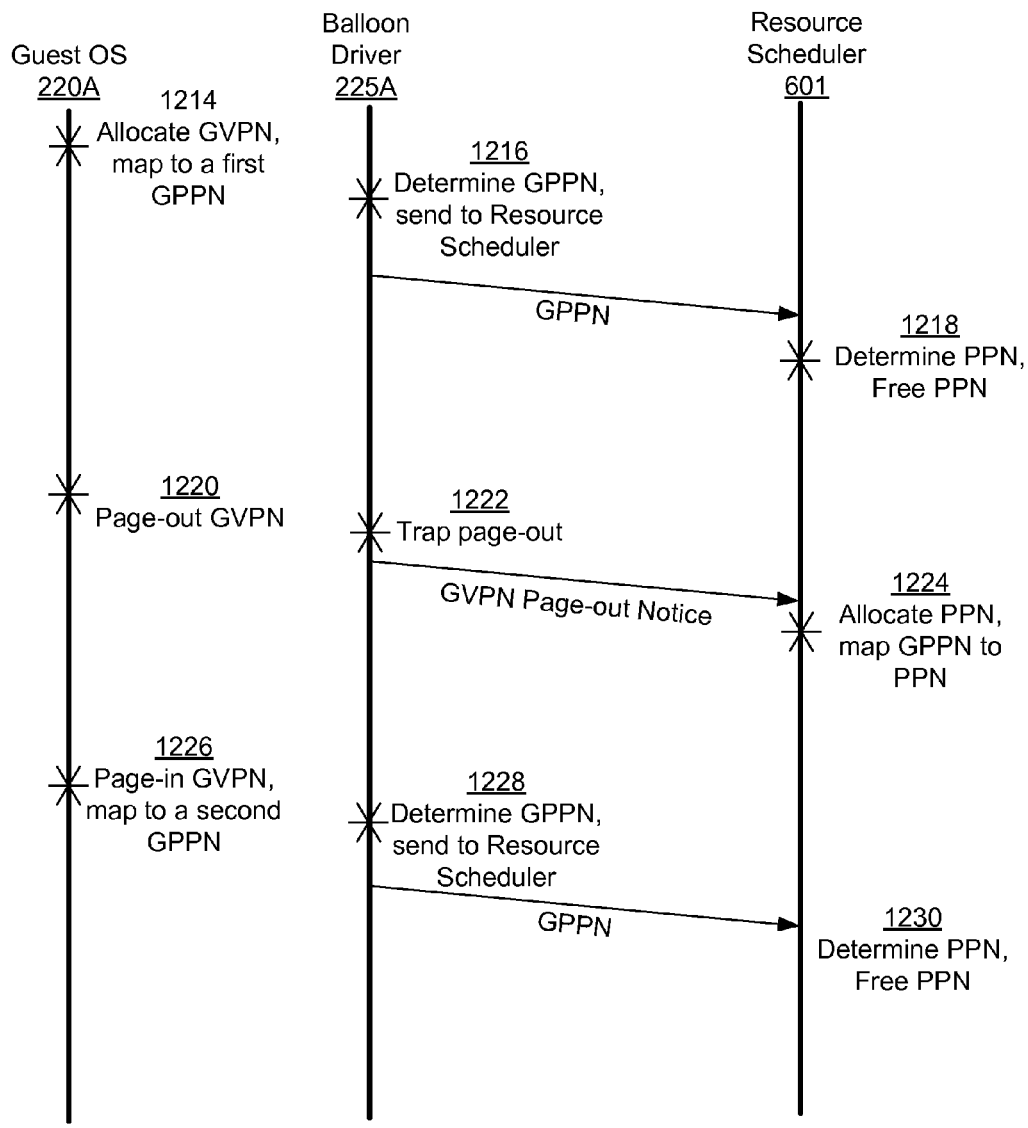
FIG. 12 illustrates a method for reclaiming physical memory, according to another embodiment of the present invention.

FIG. 12 illustrates a method for reclaiming physical memory, according to another embodiment of the present invention. FIG. 12 shows an exemplary timeline along with steps performed by the guest operating system 220, the balloon application driver 225, and the resource scheduler 601 in one of the embodiments employing an unmapping method.

The guest operating system 220 allocates 1214 a GVPN and maps the GVPN to a GPPN. Typically the guest operating system 220 allocates 1214 a GVPN in response to a request for memory by the balloon application 261. The guest operating system 220 may map the GVPN to a first GPPN either upon the allocation of the GVPN, or in response to a write or read to the GVPN by the balloon application 261. The first GPPN in turn is mapped to a PPN.

The balloon application driver 225 determines 1216 the GPPN to which the GVPN is mapped. The balloon application driver 225 sends the GPPN to the resource scheduler 601.

The resource scheduler 601 determines 1218 the PPN to which the GPPN is mapped, and frees the PPN. The physical memory allocated to the virtual machine is reclaimed, and the PPN may then be assigned to another virtual machine, or may enter a pool of available PPNs.

The guest operating system 220 pages-out 1220 the GVPN allocated to the balloon application 261. A different GVPN, possibly not allocated to the balloon application 261, may now be mapped to the GPPN. (In some operating systems, the GVPN may still map to the GPPN although the GVPN has been paged out. However, when the GPPN is later used for another purpose this mapping will be modified.)

The balloon application driver 225 traps 1222 the page-out, and sends a GVPN page-out notice to the resource scheduler 601. According to one embodiment of the present invention, the resource scheduler 601 includes the GPPN to which the paged-out GVPN was previously mapped.

The resource scheduler 601 allocates 1224 a PPN (either from a pool of available PPNs or by reclaiming a PPN allocated to another virtual machine) and maps the GPPN to the PPN. According to one embodiment of the present invention, the resource scheduler 601 blocks the virtual machine until a PPN can be reclaimed and allocated.

The guest operating system 220 pages-in 1226 the GVPN allocated to the balloon application 261. The GVPN is now mapped to a second GPPN, although potentially this GPPN is different than the first GPPN.

The balloon application driver 225 determines 1228 the GPPN to which the GVPN is mapped. According to one embodiment of the present invention, the balloon application driver 225 determines 1228 the GPPN to which the GVPN is mapped by observing the page table modifications performed by the guest operating system 220. According to another embodiment of the present invention, the virtual machine monitor (or another component of the virtualization layer) determines the GPPN to which the GVPN is mapped by observing the page table modifications performed by the guest operating system 220, and sends the GPPN to the resource scheduler 601.

The resource scheduler 601 determines 1230 the PPN to which the GPPN is mapped, and frees the PPN. The PPN may then be assigned to another virtual machine, or may enter a pool of available PPNs. Thus the cycle can repeat, with the guest operating system 220 periodically page-in and paging-out the GVPN allocated to the balloon application 261, and the resource scheduler 601 repeatedly freeing and allocating PPNs in response to messages from the balloon application driver 225. By unmapping GPPNs in use by the balloon application 261, physical pages may be reclaimed from the virtual machine. Furthermore, allocating physical pages when the balloon application's allocation is paged-out facilitates the continued functionality of the virtual machine.

Several page-sharing and unmapping methods have been presented herein in conjunction with various embodiments for the purpose of illustration. These examples have been selected for the purposes of illustration and are not limiting. When various optional elements and features are described as applicable to certain methods, it is presumed that these elements and features may also be applicable to other methods described herein. One of skill in the art will recognize various useful combinations of the elements, methods, and embodiments described herein without departing from the scope of the present invention.

Figure 13:
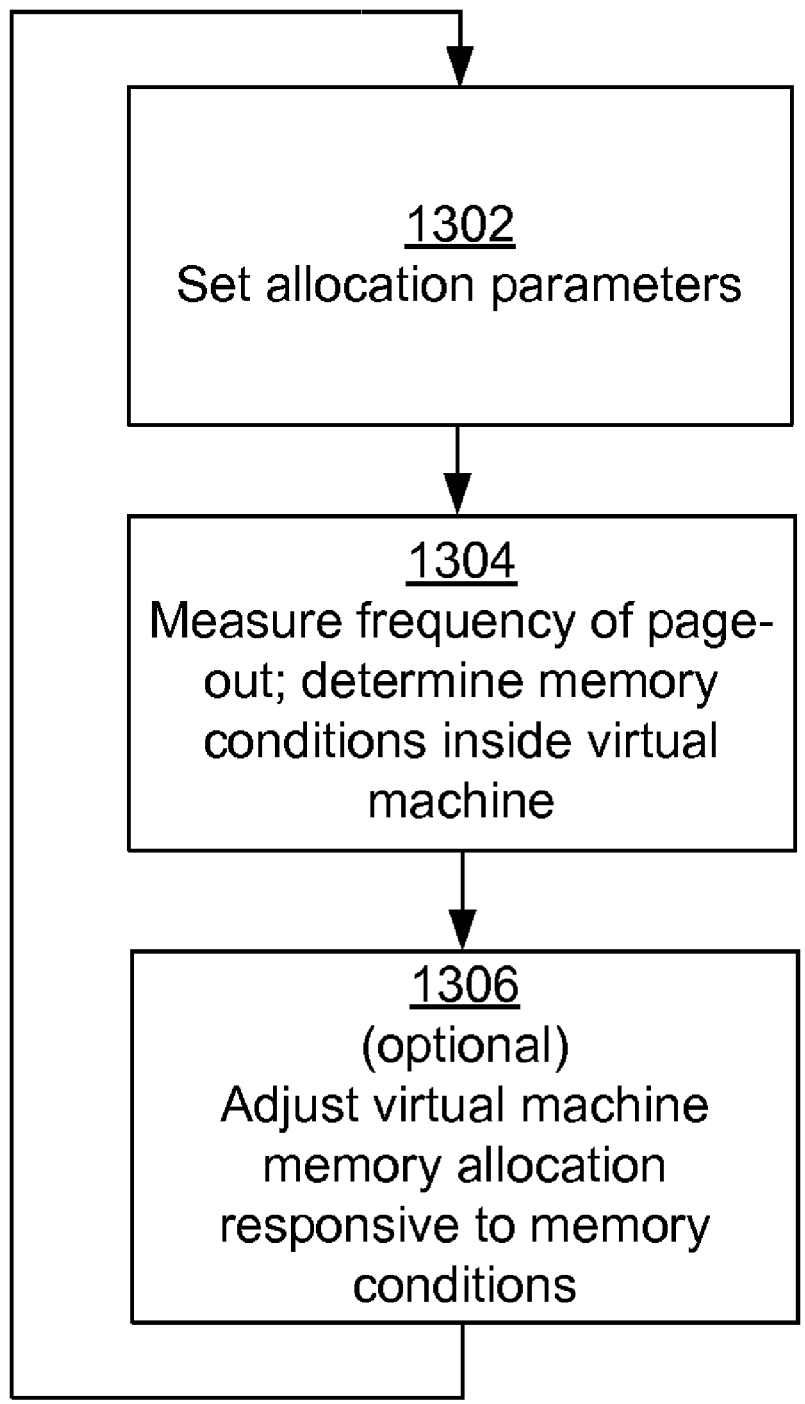
FIG. 13 illustrates a method for determining memory conditions inside a virtual machine.

FIG. 13 illustrates a method for determining memory conditions inside a virtual machine. According to one embodiment of the present invention, the method is performed by the resource scheduler 601.

By using a balloon application 261 to reserve guest virtual memory, the resource scheduler 601 is capable of determining memory conditions inside the virtual machine. The allocation to the balloon application 261 is subject to page-out and page-in by the guest operating system 220. The rate and manner of the page-out and page-in of the allocation are typically reflective of memory conditions inside the virtual machine, and in many cases are useful for insight into the memory management operations being performed by the guest operating system 220. Thus the balloon application 261 is further useful for determining memory conditions inside the virtual machine. The balloon application 261 receives an allocation of guest virtual memory, and is then subject to the winds and currents of the paging operations of the guest operating system 220—much the same as other guest applications. Testing and understanding memory conditions inside the virtual machine, as well as witnessing the paging practices of the guest operating system 220 firsthand, can improve the effectiveness of the allocation of resources to the various virtual machines.

The resource scheduler 601 sets 1302 allocation parameters for the balloon application 261. According to one embodiment of the present invention, the allocation parameters provide a plurality of inputs with which the resource scheduler 601 can manipulate the balloon application 261. For example, according to one embodiment of the present invention, a balloon application 261 requests a guest virtual memory allocation of a size indicated by allocation parameters. As another example, according to one embodiment of the present invention, the balloon application 261 accesses its guest virtual memory allocation with a frequency indicated by the allocation parameters. According to another embodiment, the balloon application driver 225 periodically sets access bits for one or more of the GVPNs allocated to the balloon application 261, and the frequency of these accesses is indicated by the allocation parameters.

According to one embodiment of the present invention, the allocation parameters include an average frequency with which the balloon application 261 or balloon application driver 225 should access the memory allocation. When the allocation parameters specify an average access frequency, the frequency with which the memory location is accessed can vary from access to access in some interval around the average frequency. Varying the access frequency can beneficially avoid unintentional correlation with periodic operations inside the guest operating system 220, and can provide more consistent paging performance and smoother measurements of memory conditions inside the virtual machine According to one embodiment of the present invention, the allocation parameters specify different access frequencies for different memory regions. For example, the balloon application driver 225 may be instructed to access certain portions of its allocation with a first frequency and other portions of its allocation with a second frequency. The allocation parameters can specify any number of frequencies for any number of different memory regions, and for any number of balloon applications. By specifying different access frequencies for different memory regions, the resource scheduler 601 can determine the memory constraint of the virtual machine on various time scales, providing greater insight into the memory conditions of the virtual machine.

The resource scheduler 601 measures 1304 the frequency of the page-out of the balloon application's guest virtual memory allocation and determines memory conditions inside the virtual machine. In one embodiment, the frequency of page-out is measured 1304 by measuring an interval between causing a guest virtual location to be mapped to a guest physical location and determining that the guest virtual location is not mapped to the guest physical location. The interval can be measured in a variety of units. For example, the interval can be measured in seconds, physical CPU cycles, virtual CPU cycles, virtual machine execution time, or in terms of any other number of observable events. In one embodiment, an event counter is included to perform the interval measurement.

Frequent page-out of the guest virtual memory allocation may indicate that memory resources are tightly constrained inside the virtual machine. Frequent page-out of a small virtual machine allocation that is being frequently accessed would indicate a particularly stressed memory situation. On the other hand, infrequent page-out of the guest virtual memory allocation may indicate that memory resources are more available. Infrequent page-out of a large virtual machine allocation that is being accessed only rarely would indicate a particularly relaxed memory situation. Depending on the guest operating system 220, the frequency of page-out of memory allocations resulting from various combinations of allocation parameters may have different interpretations with respect to memory conditions inside the virtual machine.

The frequency with which a page is paged-out is closely related to the age of that page at the time of page-out. The age of a page at page-out is a measurement of the amount of time between the last detected access to that page and the paging-out of the page. Under relaxed memory conditions, the pages that are paged-out will tend to be very old, as page-outs occur infrequently and even relatively inactive pages will typically be allowed to remain in memory. As memory becomes more constrained, however, the guest operating system will page-out more frequently, and will typically page-out younger and younger pages.

By detecting page-out of pages allocated to the balloon application 261, the resource scheduler 601 can estimate the average age of pages being paged-out by the guest operating system 220. For example, the resource scheduler 601 can perform a moving average, or any other statistical characterization, of the age of the pages allocated to the balloon application 261 at page-out, and use this data to estimate memory conditions in the virtual machine. Furthermore, the resource scheduler 601 can set multiple access frequencies for the balloon application 261 and observe which pages are paged-out to determine the approximate age of pages being paged-out by the guest operating system 220. The age of pages being paged-out is a useful metric, for example, for comparing memory conditions among multiple virtual machines. Other examples of metrics of memory conditions inside the virtual machine that can be usefully estimated using a balloon application will be apparent to one of skill in the art without departing from the scope of the present invention.

The resource scheduler 601 can further determine memory conditions in the virtual machine by observing how the age of pages being paged-out changes in response to manipulations of the size and/or access frequency of the allocation to the balloon application.

The resource scheduler 601 can use the determined memory conditions for a variety of purposes. According to one embodiment of the present invention, the resource scheduler 601 optionally adjusts 1306 the allocation of physical memory to the various virtual machines in response to the determined 1304 memory conditions. For example, a virtual machine demonstrating a particularly tight memory situation may have the effective size of its guest physical memory expanded, while a virtual machine demonstrating a relaxed memory situation may have the effective size of its guest physical memory reduced. The allocation of physical memory to the various virtual machines may be adjusted accordingly. The allocation of physical memory to the various virtual machines can be adjusted by paging-out guest physical memory to another storage device, by use of a balloon application, or by other known methods for reclaiming memory from a virtual machine. For example, the allocation of physical memory to the various virtual machines can be adjusted by changing the frequency with which memory allocated to a balloon application is accessed, or by changing the size of the memory allocated to a balloon application. The resource scheduler 601 returns to set 1302 allocation parameters for the balloon application 261.

According to another embodiment of the present invention, the determined memory conditions are sent to a guest application running in the virtual machine. The memory conditions may be sent from the resource scheduler 601 to a guest application in a variety of ways. For example, the guest application can make a hypercall to the virtualization layer, which in turn provides memory condition data to the guest application. As another example, virtual input/output ports on the virtual machine can be used to transfer memory condition data to a guest application. As yet another example, shared memory can be used to send determined memory conditions to the guest application. In one embodiment, the guest application to which determined memory conditions are sent can be the balloon application 261.

Furthermore, a first guest application running on the virtual machine can send the memory condition data to other guest applications. For example, a first guest application can be designed to work in conjunction with the virtualization layer to receive memory condition data, and this memory condition data can be sent to other guest applications through a shared function library.

Sending memory condition data to a guest application allows for a more efficient use of system resources. For example, some guest applications, such as database server applications, maintain large data structures, such as hash tables, that are pinned in guest physical memory. The size of these guest data structures typically depends on the size of the guest physical memory. However, as some of the guest physical memory could have been reclaimed by the resource scheduler 601, the guest application may have out of date or faulty data regarding the size of the guest physical memory. Sending memory condition data to the guest application can improve the effectiveness of the guest data structures. As another example, some guest applications organize their memory space differently under different memory conditions, and have routines for querying the guest operating system 220 for information about memory conditions. In a virtual machine, the guest operating system 220 sometimes does not have complete information about the true state of memory for that virtual machine. Sending memory condition data to the guest application facilitates efficient memory use by the application.

According to yet another embodiment of the present invention, the memory condition data is stored and analyzed. Memory condition data can provide insight into the behavior of the guest operating system 220, which is useful for the development of operating systems and for the improvement of the virtualization layer. For example, analysis of the memory condition data may show whether the guest operating system 220 is paging-out pages randomly, or using a technique such as Least Recently Used (LRU) paging. Determining the paging policies of the guest operating system 220 can facilitate improved virtualization performance.

The resource scheduler and balloon application can also cooperative to push memory conditions in the virtual machine towards some target memory conditions. The target memory conditions can define conditions in which a certain level of virtual machine performance can be expected. For example, when pages are paged-out too frequently, a computer system can spend a disproportionate amount of time paging-in and paging-out rather than making forward computational progress. Such a condition is commonly referred to as "thrashing". In this example, there may be a certain average age of paged-out pages below which thrashing occurs and the performance of the virtual machine suffers significantly. If the average age of paged-out pages is maintained above that threshold, thrashing may be avoided and system performance improved. In on example, the target memory conditions define conditions that will ordinarily avoid thrashing.

Figure 14:
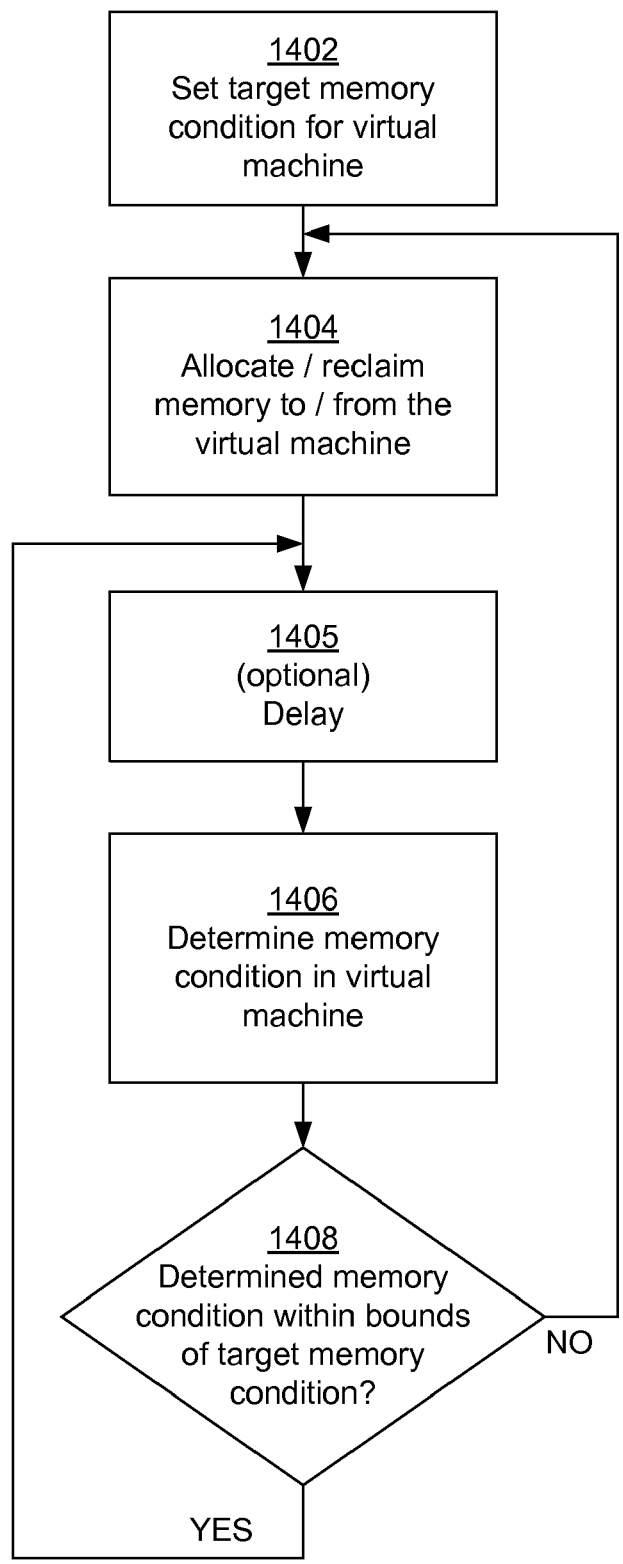
FIG. 14 illustrates a method for controlling memory conditions inside a virtual machine.

FIG. 14 illustrates a method for controlling memory conditions inside a virtual machine. The resource scheduler 601 sets 1402 a target memory condition. For example, the resource scheduler 601 may set 1402 a target average age of paged-out pages so that the target is above some thrashing threshold. According to one embodiment of the present invention, the target memory condition can be adjusted in response to the performance of the virtual machine. For example, thrashing can sometimes be detected by monitoring the performance of the virtual hardware, or by querying the guest operating system 220 for performance information. When thrashing is detected, target memory conditions can be adjusted accordingly.

The resource scheduler 601 allocates or reclaims 1404 memory to adjust the memory allocation to the virtual machine. The resource scheduler 601 can adjust the memory allocation to the virtual machine by use of a balloon application, through paging-out of guest physical memory, or using another method.

Optionally, the resource scheduler 601 delays 1405. For example, the resource scheduler 601 can delay 1405 for some predetermined amount of time. Delaying beneficially allows the memory state in the virtual machine to settle before making further determinations.

The resource scheduler 601 determines 1406 a memory condition in the virtual machine. For example, the resource scheduler 601 can determine 1406 the average age of pages paged-out in the virtual machine. The resource scheduler 601 can determine 1406 a memory condition, for example, using one of the methods described herein with reference to FIG. 13.

The resource scheduler 601 determines 1408 if the determined memory condition is within the bounds of the target memory condition. For example, the resource scheduler 601 can determine 1408 if the determined average age of pages paged-out in the virtual machine is equal to or above the target average age of paged-out pages. If the determined average age is equal to or above the target average age, the determined memory condition is within the bounds of the target memory condition. If the determined average age is below the target average age, the determined memory condition is outside the bounds of the target memory condition.

The bounds of the target memory condition can be multidimensional, and can depend on any number of factors. As another example, the resource scheduler 601 can determine 1408 if the number of pages allocated to the balloon application 261 paged-out by the guest operating system 220 with ages below a target age exceeds some target threshold. Other examples will be apparent to one of skill in the art without departing from the scope of the present invention.

If the resource scheduler 601 determines 1408 that the determined memory condition is outside the bounds of the target memory condition, the resource scheduler 601 adjusts the memory allocation to the virtual machine by returning to allocate or reclaim 1404 memory. For example, if the determined average age of pages paged-out in the virtual machine is equal to or below the target average age of paged-out pages, the resource scheduler 601 can allocate additional memory to the virtual machine. As another example, if the determined memory condition indicates a large margin above the target memory condition, and memory resources are in demand from other virtual machines, the resource scheduler 601 can reclaim memory from the virtual machine.

If the resource scheduler 601 determines 1408 that the determined memory condition is within the bounds of the target memory condition, the resource scheduler 601 returns to determining 1406 memory conditions in the virtual machine. According to one embodiment of the present invention, the resource scheduler 601 returns to delaying 1405.

Thus the resource scheduler 601 and balloon application 261 can be used in conjunction to set memory conditions in the virtual machine to a target memory condition. The target memory condition can be given as any metric by which memory conditions can be measured. The target memory condition can be selected to optimize the performance of the virtual machine, or to optimize the performance of the virtual machine subject to some constraint, such as the requirements of other virtual machines. Different virtual machines can have different target memory conditions. The resource scheduler 601 can prioritize virtual machines and set target memory conditions based on these priorities. For example, the target age for a low-priority virtual machine may be much lower than the target age for a high-priority virtual machine. As another example, the resource scheduler 601 can attempt to set target memory conditions such that none of the virtual machines enters a thrashing state, and allocate memory resources accordingly. If satisfying this constraint proves difficult, the resource scheduler 601 can attempt to set target memory conditions such that certain high priority virtual machines are kept out of a thrashing state, potentially at the expense of the performance of other virtual machines. The resource scheduler 601 can then allocate memory resources accordingly. These examples have been given for the purposes of illustration, but other applications for setting a target memory condition in a virtual machine will be apparent to one of skill in the art without departing from the scope of the present invention.

Executing a resource reservation application is a powerful tool in configurations having multiple layers of memory addressing. Not only can the application be used to reclaim memory, but the application can gather information regarding memory conditions in other memory address layers. Thus the resource application is a useful tool both for assigning balanced memory allocations and for enacting those allocations. Through cooperation on multiple levels of memory addressing, more efficient allocation of memory resources may be achieved.

Throughout this description, reference is made to reserving a location in memory, determining a page number, sending a page number, reclaiming a page number, and so on. In the interest of clarity, various embodiments of the present invention have been described using singular terminology. Furthermore, when reference is made herein to a "memory location'" it will be apparent that, according to various embodiments, a memory location can be a single memory address, a range of memory address, a page, a subset of a page, a range of pages, and so on. This terminology has been selected for the purposes of illustration and is not limiting. The methods described herein may be advantageously implemented as batch processes in which a plurality of locations are reserved, a plurality of page numbers are sent, determined, or reclaimed, and so on. Other techniques for combining various steps described herein will be apparent to one of skill in the art without departing from the scope of the present invention.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for managing distribution of host physical memory (HPM) among virtual machines (VMs) executing on a host via a hypervisor, each VM having guest system software including an operating system, the method comprising:
    reserving, by a balloon application executing in a first VM, a guest virtual memory (GVM) location mapped to a guest physical memory (GPM) location, which is mapped to a host physical memory (HPM) location, the balloon application being responsive to commands sent from the hypervisor for reserving memory;

reclaiming the HPM location associated with the reserved GVM location
determining a memory condition in the first VM; and
adjusting HPM allocation to the first VM when the determined memory condition is outside bounds of a target memory condition for the first VM.

2. The method as recited in claim 1, further including:
writing a value to the reserved GVM location, wherein a size of the GVM location, the GPM location, and the HPM location is one page of memory, wherein writing the value to the GVM location includes filling a page of memory corresponding to the GMV location with a pattern.

3. The method as recited in claim 2, wherein writing the value further includes filling the page of memory with all zeros.

4. The method as recited in claim 1, further including:
marking the GPM location as read only by the hypervisor; and
trapping a write to the GPM location to detect that the GPM location is no longer owned by the balloon application.

5. The method as recited in claim 1, further including:
sending a request from the hypervisor to the balloon application before reserving the GVM location.

6. The method as recited in claim 1, further including:
performing, by the balloon application, a memory read operation to the GVM location that causes the GVM location to be mapped to the GPM location.

7. The method as recited in claim 1, wherein the determining of the memory condition includes:
determining an average age of GVMs paged-out in the first VM.

8. The method as recited in claim 1, wherein the determining of the memory condition includes:
determining a number of GVMs allocated to the balloon application that are paged-out by the operating system in the first VM and that have ages below a target age.

9. The method as recited in claim 1, wherein the adjusting of the HPM allocation includes:
allocating, by the hypervisor, additional HPM to the first VM when the determining the memory condition indicates that the first VM requires additional HPM.

10. The method as recited in claim 1, wherein the adjusting of the HPM allocation includes:
reclaiming, by the hypervisor, HPM from the first VM when the determining the memory condition indicates that the first VM is available to release HPM and a second VM requires additional HPM.

11. The method as recited in claim 1, further including:
setting target memory conditions for the VMs to avoid a thrashing state in any of the VMs.

12. The method as recited in claim 1, further including:
setting target memory conditions for the VMs such that high priority VMs are kept out of a thrashing state.

13. A method for managing distribution of host physical memory (HPM) among virtual machines (VMs) executing on a host via a hypervisor, each VM having guest system software including an operating system, the method comprising:
receiving, by a balloon application executing in a first VM, a memory allocation request from the hypervisor;
reserving a guest virtual memory (GVM) location in response to the memory allocation request, the GVM location being mapped to a guest physical memory (GPM) location, which is mapped to a host physical memory (HPM) location;
reclaiming the HPM location associated with the reserved GVM location;
assigning the reclaimed HPM location to a second VM;
determining a memory condition in the first VM; and
adjusting HPM allocation to the first VM when the determined memory condition is outside bounds of a target memory condition for the first VM.

14. The method as recited in claim 13, wherein a size of the GVM location, the GPM location, and the HPM location is one page of memory.

15. The method as recited in claim 13, further including:
marking the GPM location as read only by the hypervisor; and
trapping a write to the GPM location to detect that the GPM location is no longer owned by the balloon application.

16. A system for managing distribution of physical memory among virtual machines (VMs) executing on a host computer via a hypervisor, each VM having guest system software including an operating system, the system comprising:
a balloon application executing in a first VM that is executing in the host computer, the balloon application defined to reserve a guest virtual memory (GVM) location mapped to a guest physical memory (GPM) location, which is mapped to a host physical memory (HPM) location, the balloon application being responsive to commands sent from the hypervisor for reserving memory; and
a content-based page sharing component in the hypervisor that remaps a plurality of GPM locations to a single HPM location when the balloon application writes a value to the reserved GVM location and each page from the plurality of GPM locations contains the value;
wherein the hypervisor reclaims the HPM location when the HPM location is freed due to being remapped in order to make the HPM location available to a pool of available HPM locations, and wherein the hypervisor determines a memory condition in the first VM and adjusts an HPM allocation to the first VM when the memory condition is outside bounds of a target memory condition for the first VM.

17. The system as recited in claim 16, wherein a size of the GVM location, the GPM location, and the HPM location is one page of memory, wherein writing the value to the GVM location includes filling a page of memory corresponding to the GMV location with a pattern.

18. The system as recited in claim 16, wherein the hypervisor marks the GPM location as read only, wherein the hypervisor traps any write to the GPM location to detect that the GPM location is no longer owned by the balloon application.

19. The system as recited in claim 16, wherein the balloon application performs a memory read operation to the GVM location to cause the GVM location to be mapped to the GPM location.

20. The system as recited in claim 16, wherein the hypervisor determines the memory condition by determining an average age of GVMs paged-out in the first VM.

21. The system as recited in claim 16, wherein the hypervisor determines the memory condition by determining a number of GVMs allocated to the balloon application that are paged-out by the operating system in the first VM and that have ages below a target age.

22. The system as recited in claim 16, wherein the hypervisor adjusts the HPM allocation by allocating additional HPM to the first VM when the memory condition indicates that the first VM requires additional HPM.

23. The system as recited in claim 16, wherein the hypervisor adjusts the HPM allocation by reclaiming HPM from the first VM when the memory condition indicates that the first VM is available to release HPM and a second VM requires additional HPM.

24. The system as recited in claim 16, wherein the hypervisor sets target memory conditions for the VMs to avoid a thrashing state in any of the VMs.

25. The system as recited in claim 16, wherein the hypervisor sets target memory conditions for the VMs such that high priority VMs are kept out of a thrashing state.

* * * * *